US008094584B2

(12) United States Patent
Umayabashi et al.

(10) Patent No.: US 8,094,584 B2
(45) Date of Patent: Jan. 10, 2012

(54) NODE, NETWORK SYSTEM, FRAME TRANSFER METHOD, AND FRAME TRANSFER PROGRAM

(75) Inventors: Masaki Umayabashi, Tokyo (JP);
Nobuyuki Enomoto, Tokyo (JP);
Youichi Hidaka, Tokyo (JP); Daisaku Ogasahara, Tokyo (JP); Kazuo Takagi, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 531 days.

(21) Appl. No.: 12/279,682

(22) PCT Filed: Feb. 16, 2007

(86) PCT No.: PCT/JP2007/053339
§ 371 (c)(1),
(2), (4) Date: Aug. 15, 2008

(87) PCT Pub. No.: WO2007/094520
PCT Pub. Date: Aug. 23, 2007

(65) Prior Publication Data
US 2010/0232322 A1    Sep. 16, 2010

(30) Foreign Application Priority Data
Feb. 16, 2006    (JP) ................. 2006-038894

(51) Int. Cl.
*H04L 12/28* (2006.01)
(52) U.S. Cl. ........................ 370/255; 370/256
(58) Field of Classification Search .......... 370/216–219, 370/254, 255, 256, 392, 400, 401
See application file for complete search history.

(56) References Cited

U.S. PATENT DOCUMENTS

| 6,862,618 B1 * | 3/2005 | Gray et al. ............... 709/224 |
| 2003/0179707 A1 * | 9/2003 | Bare ....................... 370/235 |
| 2003/0193959 A1 * | 10/2003 | Lui et al. ................. 370/401 |
| 2004/0160904 A1 * | 8/2004 | Enomoto et al. ......... 370/256 |
| 2004/0190454 A1 * | 9/2004 | Higasiyama ............. 370/238 |
| 2004/0225725 A1 * | 11/2004 | Enomoto et al. ......... 709/220 |

FOREIGN PATENT DOCUMENTS

| JP | 2003-318933 A | 11/2003 |
| JP | 2004-214816 A | 7/2004 |
| WO | 2004/088931 A1 | 10/2004 |

OTHER PUBLICATIONS

IEEE 802.1D, "IEEE Standard for Local and Metropolitan Area Networks, MAC Bridges", 2004, pp. 1-281.*
Office Action issued Nov. 2, 2011 from the Japanese Patent Office in counterpart Japanese application No. 2008-500596.

* cited by examiner

*Primary Examiner* — Jung Park
(74) *Attorney, Agent, or Firm* — Sughrue Mion, PLLC

(57) ABSTRACT

For eliminating a reduction in throughput in a network as a whole according to optimum path transfer technique which is the expansion of spanning tree protocol, a frame switching unit of the network has an STP control unit for, when a port state of a spanning tree is changed, notifying a table control unit of an identifier of the spanning tree and a port number of a predetermined port among the respective ports, the table control unit for setting, in a forwarding table storage unit, a received port number of a predetermined port as an output port in an entry in which a node ID is equivalent to a spanning tree identifier, and a table search unit for determining an output destination from among output ports obtained by acquisition of received frame information from a frame analysis unit.

36 Claims, 39 Drawing Sheets

FIG. 5

900   Tag TABLE

| EXPANSION TAG | OUTPUT PORT |
|---|---|
| | |
| | |
| | |
| ⋮ | ⋮ |
| | |
| | |

FIG. 6

910   MAC/Tag TABLE

| MAC ADDRESS | VLAN | EXPANSION TAG |
|---|---|---|
| | | |
| | | |
| | | |
| ⋮ | ⋮ | ⋮ |
| | | |
| | | |

FIG. 7

920 MAC TABLE

| MAC ADDRESS | VLAN | OUTPUT PORT |
|---|---|---|
| | | |
| | | |
| | | |
| ⋮ | ⋮ | ⋮ |
| | | |
| | | |

FIG. 8

1300 STP PORT STATE MANAGEMENT TABLE

| VLAN | STP PORT INFORMATION | | | |
|---|---|---|---|---|
| | p1 | p2 | p3 | p4 |
| 0 | R/f | D/f | A/d | D/f |
| | | | | |
| ⋮ | ⋮ | ⋮ | ⋮ | ⋮ |
| | | | | |
| | | | | |

FIG. 11

(A)
1401 STP PORT STATE MANAGEMENT TABLE (EDGE SWITCH E5)

| VLAN | STP PORT INFORMATION | | |
|---|---|---|---|
| | p1 | p2 | p3 |
| g5 | — | D/f | D/f |

(B)
1402 STP PORT STATE MANAGEMENT TABLE (EDGE SWITCH E6)

| VLAN | STP PORT INFORMATION | | |
|---|---|---|---|
| | p1 | p2 | p3 |
| g5 | R/f | D/f | — |

(C)
1403 STP PORT STATE MANAGEMENT TABLE (EDGE SWITCH E7)

| VLAN | STP PORT INFORMATION | | |
|---|---|---|---|
| | p1 | p2 | p3 |
| g5 | R/f | — | D/f |

(D)
1404 STP PORT STATE MANAGEMENT TABLE (EDGE SWITCH E8)

| VLAN | STP PORT INFORMATION | | |
|---|---|---|---|
| | p1 | p2 | p3 |
| g5 | R/f | A/d | — |

(E)
1405 STP PORT STATE MANAGEMENT TABLE (CORE SWITCH C5)

| VLAN | STP PORT INFORMATION | | |
|---|---|---|---|
| | p1 | p2 | p3 |
| g5 | R/f | D/f | D/f |

(F)
1406 STP PORT STATE MANAGEMENT TABLE (CORE SWITCH C6)

| VLAN | STP PORT INFORMATION | | |
|---|---|---|---|
| | p1 | p2 | p3 |
| g5 | R/f | A/d | D/f |

FIG. 12

(A) 1404 STP PORT STATE MANAGEMENT TABLE

| VLAN | STP PORT INFORMATION | | |
|---|---|---|---|
| | p1 | p2 | p3 |
| g5 | R/f | A/d | — |

(B) 1501 Tag TABLE

| EXPANSION TAG | OUTPUT PORT |
|---|---|
| g5 | p1, p2 |
| | |
| | |

(C) 1502 MAC/Tag TABLE

| MAC ADDRESS | VLAN | EXPANSION TAG |
|---|---|---|
| t5 | A | g5 |
| t6 | B | g6 |
| t7 | B | g7 |

(D) 1503 MAC TABLE

| MAC ADDRESS | VLAN | OUTPUT PORT |
|---|---|---|
| t8 | A | p3 |
| | | |
| | | |

FIG. 13

(A) 1406 STP PORT STATE MANAGEMENT TABLE

| VLAN | STP PORT INFORMATION | | |
|---|---|---|---|
| | p1 | p2 | p3 |
| g5 | R/f | A/d | D/f |

(B) 1601 Tag TABLE

| EXPANSION TAG | OUTPUT PORT |
|---|---|
| g5 | p1, p2 |
| | |
| | |

FIG. 14

(A) STP PORT STATE MANAGEMENT TABLE 1402

| VLAN | STP PORT INFORMATION | | |
|---|---|---|---|
| | p1 | p2 | p3 |
| g5 | R/f | D/f | — |

(B) 1701 Tag TABLE

| EXPANSION TAG | OUTPUT PORT |
|---|---|
| g5 | p1 |
| | |
| | |

(C) 1702 MAC/Tag TABLE

| MAC ADDRESS | VLAN | EXPANSION TAG |
|---|---|---|
| t5 | A | g5 |
| t7 | B | g7 |
| t8 | A | g8 |

(D) 1703 MAC TABLE

| MAC ADDRESS | VLAN | OUTPUT PORT |
|---|---|---|
| t6 | B | p3 |
| | | |
| | | |

FIG. 15

(A) 1401 STP PORT STATE MANAGEMENT TABLE

| VLAN | STP PORT INFORMATION | | |
|---|---|---|---|
| | p1 | p2 | p3 |
| g5 | — | D/f | D/f |

(B) 1801 Tag TABLE

| EXPANSION TAG | OUTPUT PORT |
|---|---|
| g5 | — |
| | |
| | |

(C) 1802 MAC/Tag TABLE

| MAC ADDRESS | VLAN | EXPANSION TAG |
|---|---|---|
| t6 | B | g6 |
| t7 | B | g7 |
| t8 | A | g8 |

(D) 1803 MAC TABLE

| MAC ADDRESS | VLAN | OUTPUT PORT |
|---|---|---|
| t5 | A | p1 |
| | | |
| | | |

FIG. 16

(A) 1403 STP PORT STATE MANAGEMENT TABLE

| VLAN | STP PORT INFORMATION | | |
|---|---|---|---|
| | p1 | p2 | p3 |
| g5 | R/f | — | D/f |

(B) 1901 Tag TABLE

| EXPANSION TAG | OUTPUT PORT |
|---|---|
| g5 | p1 |
| | |
| | |

(C) 1902 MAC/Tag TABLE

| MAC ADDRESS | VLAN | EXPANSION TAG |
|---|---|---|
| t5 | A | g5 |
| t6 | B | g6 |
| t8 | A | g8 |

(D) 1903 MAC TABLE

| MAC ADDRESS | VLAN | OUTPUT PORT |
|---|---|---|
| t7 | B | p2 |
| | | |
| | | |

FIG. 17

(A) 1405 STP PORT STATE MANAGEMENT TABLE

| VLAN | STP PORT INFORMATION | | |
|---|---|---|---|
| | p1 | p2 | p3 |
| g5 | R/f | D/f | D/f |

(B) 2001 Tag TABLE

| EXPANSION TAG | OUTPUT PORT |
|---|---|
| g5 | p1 |
| | |
| | |

FIG. 21

(A) 2400 STP PORT STATE MANAGEMENT TABLE

| VLAN | STP PORT INFORMATION | | |
|---|---|---|---|
| | p1 | p2 | p3 |
| g5 | — | R/f | D/f |

(B) 2401 Tag TABLE

| EXPANSION TAG | OUTPUT PORT |
|---|---|
| g5 | p2 |
| | |
| | |

FIG. 22

(A) 2500 STP PORT STATE MANAGEMENT TABLE

| VLAN | STP PORT INFORMATION | | |
|---|---|---|---|
| | p1 | p2 | p3 |
| g5 | R/f | — | — |

(B) 1701 Tag TABLE

| EXPANSION TAG | OUTPUT PORT |
|---|---|
| g5 | p1 |
| | |
| | |

(C) 1702 MAC/Tag TABLE

| MAC ADDRESS | VLAN | EXPANSION TAG |
|---|---|---|
| t5 | A | g5 |
| t7 | B | g7 |
| t8 | A | g8 |

(D) 1703 MAC TABLE

| MAC ADDRESS | VLAN | OUTPUT PORT |
|---|---|---|
| t6 | B | p3 |
| | | |
| | | |

2700 Tag TABLE

| EXPANSION TAG | OUTPUT PORT |
|---|---|
|  |  |
|  |  |
|  |  |
| ⋮ | ⋮ |
|  |  |
|  |  |

FIG. 28

(A)
1404 STP PORT STATE MANAGEMENT TABLE

| VLAN | STP PORT INFORMATION | | |
|---|---|---|---|
| | p1 | p2 | p3 |
| g5 | R/f | A/d | — |

(B)
2901 Tag TABLE

| EXPANSION TAG | OUTPUT PORT |
|---|---|
| g5 | p1 |
| | |
| | |

(C)
1502 MAC/Tag TABLE

| MAC ADDRESS | VLAN | EXPANSION TAG |
|---|---|---|
| t5 | A | g5 |
| t6 | B | g6 |
| t7 | B | g7 |

(D)
1503 MAC TABLE

| MAC ADDRESS | VLAN | OUTPUT PORT |
|---|---|---|
| t8 | A | p3 |
| | | |
| | | |

FIG. 29

(A)
1406 STP PORT STATE MANAGEMENT TABLE

| VLAN | STP PORT INFORMATION | | |
|---|---|---|---|
| | p1 | p2 | p3 |
| g5 | R/f | A/d | D/f |

(B)
3001 Tag TABLE

| EXPANSION TAG | OUTPUT PORT |
|---|---|
| g5 | p1 |
| | |
| | |

2400 STP PORT STATE MANAGEMENT TABLE

| VLAN | STP PORT INFORMATION | | |
|---|---|---|---|
| | p1 | p2 | p3 |
| g5 | — | R/f | D/f |

(B)

3101  Tag TABLE

| EXPANSION TAG | OUTPUT PORT |
|---|---|
| g5 | p2 |
| | |
| | |

FIG. 31

2800  Tag TABLE

| EXPANSION TAG | OUTPUT PORT | OUTPUT PORT FOR FAILURE OCCURRENCE |
|---|---|---|
| | | |
| | | |
| | | |
| ⋮ | ⋮ | ⋮ |
| | | |
| | | |

FIG. 36

(A) 1404 STP PORT STATE MANAGEMENT TABLE

| VLAN | STP PORT INFORMATION | | |
|------|----|----|----|
|      | p1 | p2 | p3 |
| g5   | R/f | A/d | — |

(B) 2901 Tag TABLE

| EXPANSION TAG | OUTPUT PORT | OUTPUT PORT FOR FAILURE OCCURRENCE |
|---|---|---|
| g5 | p1 | p2 |
| | | |
| | | |

(C) 1502 MAC/Tag TABLE

| MAC ADDRESS | VLAN | EXPANSION TAG |
|---|---|---|
| t5 | A | g5 |
| t6 | B | g6 |
| t7 | B | g7 |

(D) 1503 MAC TABLE

| MAC ADDRESS | VLAN | OUTPUT PORT |
|---|---|---|
| t8 | A | p3 |
| | | |
| | | |

FIG. 37

(A) 1406 STP PORT STATE MANAGEMENT TABLE

| VLAN | STP PORT INFORMATION | | |
|------|----|----|----|
|      | p1 | p2 | p3 |
| g5   | R/f | A/d | D/f |

(B) 3001 Tag TABLE

| EXPANSION TAG | OUTPUT PORT | OUTPUT PORT FOR FAILURE OCCURRENCE |
|---|---|---|
| g5 | p1 | p2 |
| | | |
| | | |

STP PORT STATE MANAGEMENT TABLE
2400

| VLAN | STP PORT INFORMATION | | |
|------|----|----|----|
|      | p1 | p2 | p3 |
| g5   | —  | R/f | D/f |

(B)

3101 Tag TABLE

| EXPANSION TAG | OUTPUT PORT | OUTPUT PORT FOR FAILURE OCCURRENCE |
|---|---|---|
| g5 | p2 | — |
|  |  |  |
|  |  |  |

FIG. 39

3400 ETHERNET FRAME

| t9 (DESTINATION MAC ADDRESS) | t10 (TRANSMISSION SOURCE MAC ADDRESS) | A (VLAN TAG) | Type | PAYLOAD | FCS |

FIG. 40

3500 VLAN TAG

| TPID=8100 | Priority | | VID |

CRI

FIG. 41

3600 EXPANSION TAG FRAME

| t9 (DESTINATION MAC ADDRESS) | t10 (TRANSMISSION SOURCE MAC ADDRESS) | g5 (EXPANSION TAG) | A (VLAN TAG) | Type | PAYLOAD | FCS |

FIG. 44

3800 Tag TABLE

| EXPANSION TAG | OUTPUT PORT | ROUTE PATH COST | OUTPUT PORT FOR FAILURE OCCURRENCE | ROUTE PATH COST |
|---|---|---|---|---|
| | | | | |
| | | | | |
| | | | | |
| ⋮ | ⋮ | ⋮ | ⋮ | ⋮ |
| | | | | |
| | | | | |

FIG. 47

(A) 1404 STP PORT STATE MANAGEMENT TABLE

| VLAN | STP PORT INFORMATION | | |
|---|---|---|---|
| | p1 | p2 | p3 |
| g5 | R/f | A/d | — |

(B) 4001 Tag TABLE

| EXPANSION TAG | OUTPUT PORT | ROUTE PATH COST | OUTPUT PORT FOR FAILURE OCCURRENCE | ROUTE PATH COST |
|---|---|---|---|---|
| g5 | p1 | 3 | p2 | 3 |
| | | | | |
| | | | | |

(C) 1502 MAC/Tag TABLE

| MAC ADDRESS | VLAN | EXPANSION TAG |
|---|---|---|
| t5 | A | g5 |
| t6 | B | g6 |
| t7 | B | g7 |

(D) 1503 MAC TABLE

| MAC ADDRESS | VLAN | OUTPUT PORT |
|---|---|---|
| t8 | A | p3 |
| | | |
| | | |

FIG. 48

(B) 4101 Tag TABLE

| EXPANSION TAG | OUTPUT PORT | ROUTE PATH COST | OUTPUT PORT FOR FAILURE OCCURRENCE | ROUTE PATH COST |
|---|---|---|---|---|
| g5 | p1 | 2 | p2 | 11 |
| | | | | |
| | | | | |

(A) 1406 STP PORT STATE MANAGEMENT TABLE

| VLAN | STP PORT INFORMATION | | |
|---|---|---|---|
| | p1 | p2 | p3 |
| g5 | R/f | A/d | D/f |

NODE, NETWORK SYSTEM, FRAME TRANSFER METHOD, AND FRAME TRANSFER PROGRAM

This application is a National Stage Application filed under 371 of PCT Application No. PCT/JP2007/053339, filed Feb. 16, 2007, and claims priority from Japanese Patent Application No. 2006-038894, filed Feb. 16, 2006. The entire disclosures of the prior applications are incorporated by reference herein.

TECHNICAL FIELD

The present invention relates to frame transfer in a communication network and, more particularly, a node of a communication network, a network system, a frame transfer method and a frame transfer program for executing shortest path transfer of a frame.

BACKGROUND ART

In recent years, drawing attention as reasonable data services for corporate use is, wide area Ethernet (registered trademark) VPN service (wide area Ether) which is an expansion of Ethernet (registered trademark) techniques widely used in related art LAN to a wide area network. Wide area Ether takes over such advantages of the related art Ethernet (registered trademark) techniques including easy to use as Plug and Play and low costs.

FIG. 49 shows one example of a wide area Ether network. The wide area Ether network is formed of edge switches E1, E2, E3 and E4 which accommodate user terminals T1, T2, T3 and T4, respectively, and core switches C1 and C2 which execute relay operation only without accommodating a user terminal. Proposed as a system for transferring a frame in a wide area Ether network other than an ordinary Ethernet (registered trademark) frame transfer system is a method recited, for example, in Literature 1 to be described later in which with node ID assigned to the edge switches E1 through E4, each node in a wide area Ethernet (registered trademark) network transfers a frame based the node ID. In the method recited in Literature 1, with respect to a frame received from the user terminal T1~T4, an Ingress edge switch stores a node ID of an Egress edge switch to which the destination user terminal T1~T4 is connected in a VLAN tag field (hereinafter referred to as an expansion tag), each node in the wide area Ethernet (registered trademark) network transfers a frame based on the expansion tag and the Egress edge switch transfers the frame to the user terminals T1 through T4 with the expansion tag deleted from the frame. In the example shown in FIG. 49, g1, g2, g3 and g4 are set in the edge switches E1, E2, E3 and E4 as their node ID.

With reference to FIG. 50 and FIG. 51, frame format will be described. FIG. 50 shows a format of an Ethernet (registered trademark) frame 200. The Ethernet (registered trademark) frame 200 is formed of a destination MAC address 210, a transmission source MAC address 220, a VLAN tag 230, Type 240, a payload 250 and FCS 260. On the other hand, FIG. 51 shows a format of an expansion tag frame with an expansion tag added. An expansion tag frame 300 has an expansion tag 310 inserted between the transmission source MAC address 220 and the VLAN tag 230 in the Ethernet (registered trademark) frame 200. In FIG. 50 and FIG. 51, there is a case where the VLAN tag 230 is not added. In the present specification, description will be made on the premise that the VLAN tag 230 is added.

According to the Ethernet (registered trademark) techniques, without any measures, when a loop structure exists in a network, a frame might continue circulating on the loop, so that the network might go down particularly when a broadcast frame continues circulating. For avoiding this situation, even when a loop structure exists in the network, a spanning tree protocol (hereinafter referred to as STP, which technique is defined by IEEE802.1D) for forming a loop-free network or a rapid spanning tree protocol as a high-speed operation version of the same (hereinafter referred to as RSTP which technique is defined by IEEE802.1w) are used in may cases with a loop logically excluded. When using STP or RSTP, any of ports in a loop structure enters a blocking state (state where neither transmission nor reception of a main signal frame is executed, more precisely, in which while a frame is transferred, the frame is abandoned at a port in the blocking state), thereby making the structure loop-free. In the network shown in FIG. 49 as an example, while a loop structure exists among the edge switch E3, the core switch C1, the core switch C2 and the edge switch E4, attaining the blocking state by a port p2 of the core switch C2 makes the structure loop-free. In a case where such STP or RSTP is used, however, because a link connected to a blocking port is not allowed to transfer a frame, when transferring a frame between certain switches, the frame can not be transferred by the shortest path (path with a minimum number of hops). In the example shown in FIG. 49, when transferring a frame from the user terminal T2 to the user terminal T1, because a port p1 of the edge switch E2 is in the blocking state, a frame, which can not be transferred by a path from the edge switch E2 to the edge switch E1, will be transferred by a path from the edge switch E2, the core switch C2, the edge switch E4, the edge switch E3, the core switch C1 and the edge switch E1 to arrive at the user terminal T1. In other words, although the distant is one hop in terms of physical topology, five hops should be passed in terms of logical topology to prevent shortest path transfer in some cases.

Recited as a technique for solving the problem in Literature 2 is a method in which with a Multiple STP (hereinafter referred to as MSTP) capable of managing a plurality of STP/RSTP for each VLAN used, each edge switch generates STP/RSTP with its own switch as a route node, thereby making a transfer path of a frame whose destination is an edge switch which will be a route node of each STP/RSTP be its STP/RSTP. Since a link brought to be active in STP/RSTP (link not including a blocking port) is selected to be one whose link cost from a route node is the minimum, use of the method recited in Literature 2 enables transfer by a shortest path. Shown in FIG. 52 is an example of use of the method recited in Literature 2 for the above frame transfer from the user terminal T2 to T1 described with reference to FIG. 49. In FIG. 52, frame transfer from the user terminal T2 to T1 is executed by using STP/RSTP with the edge switch E1 as a route node (transfer from the edge switches E3 and E4 to E1 is also executed by using STP/RSTP with the edge switch E1 as a route node). Accordingly, a frame from the user terminal T2 arrives at the user terminal T1 via the edge switch E2 and the edge switch E1. Thus, transfer between the respective nodes can be realized by a shortest path.

For realizing such transfer as described above, recited in Literature 2 is such processing as follows. In transfer between edge switches, with a node ID set in each edge switch stored in a VLAN tag, each edge switch and core switch transfer a frame based on the ID. In FIG. 52, with the node ID g1, g2, g3 and g4 assigned to the edge switches E1, E2, E3 and E4, respectively, as described above, in transfer from the edge switch E2 to the edge switch E1, the VLAN tag g1 is stacked in a frame (this VLAN tag will be denoted as an expansion tag) at the edge switch E2, so that the edge switch E2 transfers the frame toward the edge switch E1 based on the expansion tag g1. In a forwarding table of each switch, an output port for an expansion tag value is managed, in which set as an output port is a port number of a route port (state of the port then is a forwarding state indicative of a transfer allowed state) of STP/RSTP whose route node is an edge switch having a node ID equivalent to an expansion tag value. In FIG. 52, for an output port for the expansion tag g1, each switch sets a port number of a route port in the forwarding state in STP/RSTP whose STP-ID is g1. Similarly, for transferring a frame whose destination is the user terminal T2, STP/RSTP with the edge switch E2 as a route node will be a transfer path, for transferring a frame whose destination is the user terminal T3, an STP/RSTP tree with the edge switch E3 as a route node will be a transfer path and for transferring a frame whose destination is the user terminal T4, STP/RSTP with the edge switch E4 as a route node will be a transfer path. Configurations of the respective transfer paths are illustrated in FIG. 53 (A)~(D). Thus, according to a frame destination user terminal, making an STP/RSTP tree whose route node is an edge switch to which the user terminal is connected be a transfer path enables a frame transfer path for any node to be an optimum path.

Literature 1: Hidaka et al., "Proposal of Next Generation Ethernet (registered trademark) Architecture GOE (Global Optical Ethernet (registered trademark))—(1) Basic Concept•Framework•Element Technique", Institute of Electronics, Information and Communication Engineers of Japan, Society Conference 2002, B-7-11.

Literature 2: Umayabashi et al., "Proposal of Next Generation Ethernet (registered trademark) Architecture GOE (Global Optical Ethernet (registered trademark))—(2) High Efficiency Routing and High-speed Protection", Institute of Electronic, Information and Communication Engineers of Japan, Society Conference 2002, B-7-12.

Noting a certain transfer path, however, finds the following shortcomings.

In a case, for example, of a path whose destination node is the edge switch E1 shown in FIG. 53(A) (in a case of a transfer path of a frame whose destination is a user terminal connected to the edge switch E1), although selected links form the shortest path to the edge switch E1, due to original properties of STP/RSTP, setting of a port in the blocking state causes a link which can not be used for transfer to exist.

In the example shown in FIG. 53(A), such link corresponds to a link between the core switch C1 and the core switch C2 and a link between the edge switch E3 and the edge switch E4. Also in FIG. 53 (B)~(D), there exist links which can not be used for frame transfer. In the example shown in FIG. 53, in particular, the link between the core switch C1 and the core switch C2 is used in none of transfer paths in frame transfer (whether there exists such a link not used at all as described above or not depends on parameters including topology, link costs and a port number).

In other words, path setting recited in Literature 2 enables shortest path transfer, while there is a room for improvement in link use efficiency.

An exemplary object of the present invention is to provide a node, a network system, a frame transfer method and a frame transfer program which enable an improvement in throughput of a network as a whole while executing shortest path transfer.

SUMMARY

According to a first exemplary aspect of the invention, a node of a network for transferring a data frame transmitted from a transmission source terminal to a destination terminal, includes means for using a spanning tree whose route node is a node connected to the destination terminal as a transfer path of the data frame from each node in the network to the node, means for determining an output port for the node based on port information of the spanning tree, and means for transferring a data frame to the node through the output port determined.

According to a second exemplary aspect of the invention, a frame transfer method in a network for transferring a data frame transmitted from a transmission source terminal to a destination terminal, wherein each node in the network using a spanning tree whose route node is a node connected to the destination terminal as a transfer path of the data frame to the node connected to the destination terminal, determining an output port for the node connected to the destination terminal based on port information of the spanning tree, and transferring the data frame to the node connected to the destination terminal through the output port determined.

According to a third exemplary aspect of the invention, a network system for transferring a data frame transmitted from a transmission source terminal to a destination terminal, wherein each node in the network includes means for using a spanning tree whose route node is a node connected to the destination terminal as a transfer path of the data frame to the node connected to the destination terminal, means for determining an output port for the node connected to the destination terminal based on port information of the spanning tree, and means for transferring the data frame to the node connected to the destination terminal through the output port determined.

According to a fourth exemplary aspect of the invention, a computer readable medium storing a frame transfer program executed on a node which is a computer in a network for transferring a data frame transmitted from a transmission source terminal to a destination terminal, the frame transfer program comprising the functions of using a spanning tree whose route node is a node connected to the destination terminal as a transfer path to the node connected to the destination terminal, determining an output port for the node connected to the destination terminal based on port information of the spanning tree, and transferring the frame to the node connected to the destination terminal through the output port determined.

According to the present invention, since a spanning tree whose route node is a node connected to a destination terminal is used as a frame transfer path in a network, a frame can be transferred by a shortest path and since a frame is transferred with an output port determined based on port information of the spanning tree, a link (path) not used in the related art can be used for frame transfer to improve throughput of the network as a whole.

BRIEF DESCRIPTION OF THE DRAWINGS

FIG. 5 is a Tag table of the present invention;

FIG. 6 is a MAC/Tag table of the present invention;

FIG. 7 is a MAC table of the present invention;

FIG. 8 is an STP port state management table of the present invention;

FIG. 11 is an STP port state management table of each switch according to the present invention;

FIG. 12 is a forwarding table of an edge switch E8 according to the first exemplary embodiment of the present invention;

FIG. 13 is a forwarding table of a core switch C6 according to the first exemplary embodiment of the present invention;

FIG. 14 is a forwarding table of an edge switch E6 according to the first exemplary embodiment of the present invention;

FIG. 15 is a forwarding table of an edge switch E5 according to the first exemplary embodiment of the present invention;

FIG. 16 is a forwarding table of an edge switch E7 according to the first exemplary embodiment of the present invention;

FIG. 17 is a forwarding table of a core switch C5 according to the first exemplary embodiment of the present invention;

FIG. 21 is another example of a forwarding table of the core switch C6 according to the first exemplary embodiment of the present invention;

FIG. 22 is another example of a forwarding table of the edge switch E6 according to the first exemplary embodiment of the present invention;

FIG. 28 is a forwarding table of the edge switch E8 according to the second exemplary embodiment of the present invention;

FIG. 29 is a forwarding table of the core switch C6 according to the second exemplary embodiment of the present invention;

FIG. 30 is another example of a forwarding table of the core switch C6 according to the second exemplary embodiment of the present invention;

FIG. 31 shows a further example of a Tag table according to the present invention;

FIG. 36 is a forwarding table of the edge switch E8 according to the third exemplary embodiment of the present invention;

FIG. 37 is a forwarding table of the core switch C6 according to the third exemplary embodiment of the present invention;

FIG. 38 is another example of a forwarding table of the core switch C6 according to the third exemplary embodiment of the present invention;

FIG. 39 shows another example of an Ethernet (registered trademark) frame;

FIG. 40 is a diagram showing a structure of a VLAN tag;

FIG. 41 shows another example of an expansion tag frame;

FIG. 44 shows a further example of a Tag table according to the present invention;

FIG. 47 is a forwarding table of the edge switch E8 according to the fourth exemplary embodiment of the present invention;

FIG. 48 is a forwarding table of the core switch C6 according to the fourth exemplary embodiment of the present invention;

EXEMPLARY EMBODIMENT

Next, a best mode for implementing the present invention will be described in detail with reference to drawings.

First Exemplary Embodiment

In the following, an exemplary embodiment of the present invention will be detailed with reference to the drawings.

Figure 1:
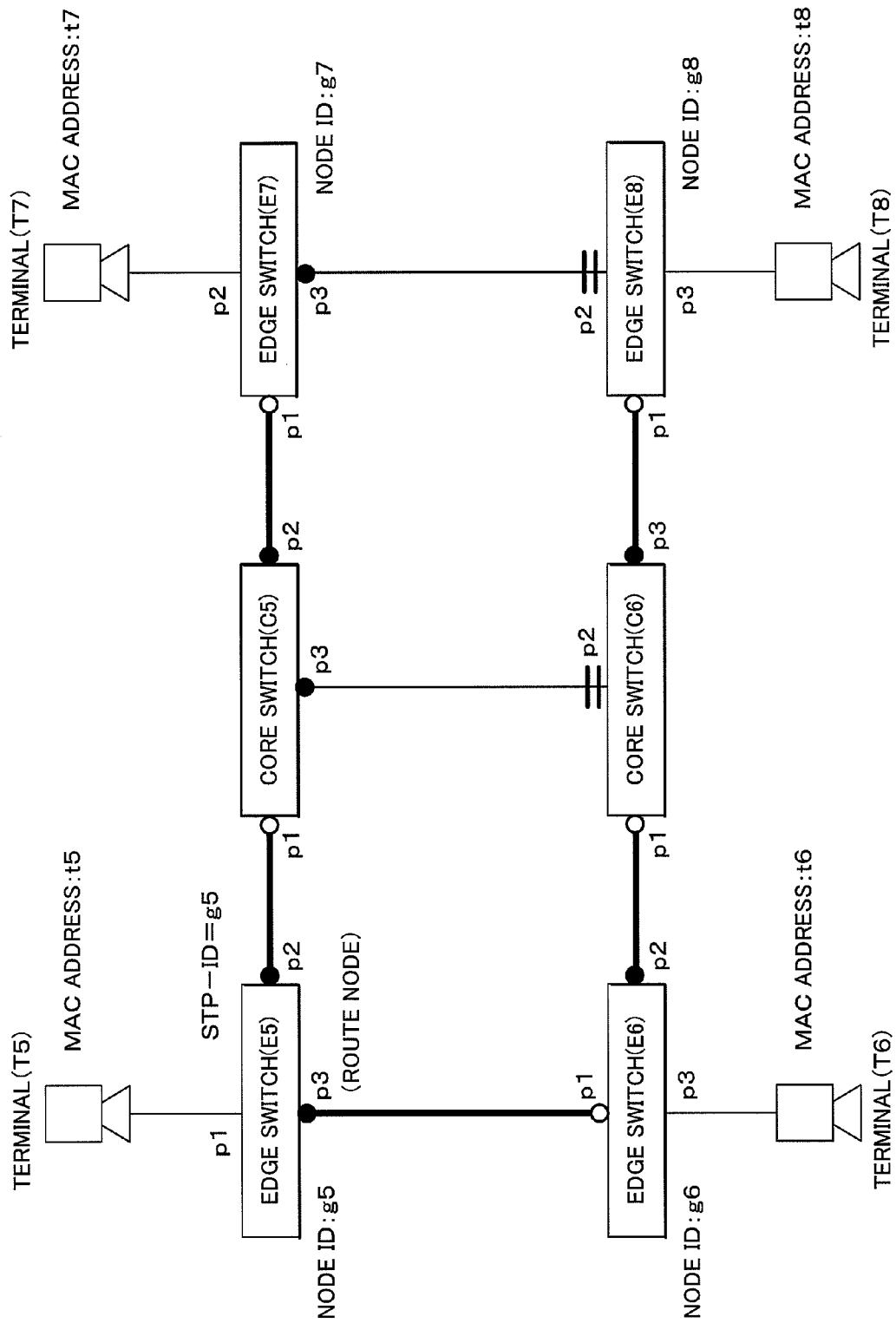
FIG. 1 is a diagram showing a network model of wide area Ether according to the present invention.

FIG. 1 shows an example of a physical network structure to which the present invention is applied.

Edge switches E5, E6, E7 and E8 and core switches C5 and C6 shown in FIG. 1 all have functions according to the present invention in addition to the related art functions. The respective switches are connected with each other in a manner as follows:

(1) a port p3 of the edge switch E5 and the port p1 of the edge switch E6, (2) the port p2 of the edge switch E5 and the port p1 of the core switch C5, (3) the port p2 of the core switch C5 and the port p1 of the edge switch E7, (4) the port p3 of the edge switch E7 and the port p2 of the edge switch E8, (5) the port p1 of the edge switch E8 and the port p3 of the core switch C6, (6) the port p1 of the core switch C6 and the port p2 of the edge switch E6, and (7) the port p3 of the core switch C5 and the port p2 of the core switch C6.

The respective edge switches E5 through E8 connect user terminals T5 through T8 in a manner as follows:

(1) the port p1 of the edge switch E5 and the user terminal T5, (2) the port p3 of the edge switch E6 and the user terminal T6, (3) the port p2 of the edge switch E7 and the user terminal T7, and (4) the port p3 of the edge switch E8 and the user terminal T8.

As frame transfer in such a network as described above, description will be made of a typical example premised on that Ethernet (registered trademark) frames transmitted from the user terminals T5 through T8 are converted into expansion tag frames with an expansion tag added at the edge switches E5 through E8, transferred by the core switches C5 and C6 based on the expansion tag and transferred to the destination user terminals T5 through T8 with the added expansion tag deleted at the edge switches E5 through E8 on the destination user terminal side.

First, description will be made of structures of the edge switches E5 through E8 and the core switches C5 and C6 with reference to FIG. 2.

Figure 2:
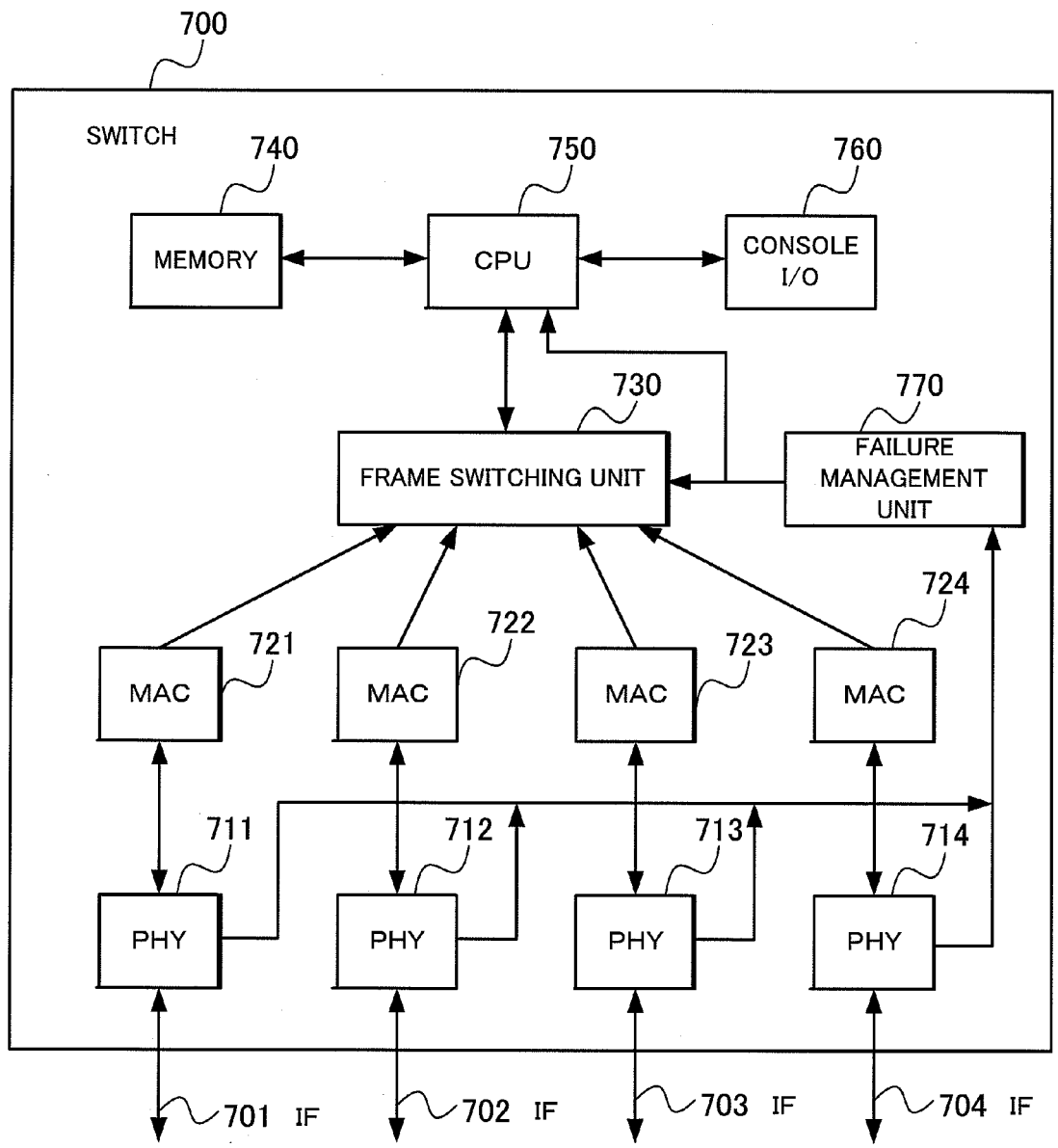
FIG. 2 is a diagram showing a structure of a switch according to the present invention.

A switch 700 shown in FIG. 2 has a common structure to those of the edge switches E5 through E8 and the core switches C5 and C6.

The switch 700 is formed of PHY 711, 712, 713 and 714, MAC 721, 722, 723 and 724, a frame switching unit 730, a memory 740, a CPU 750, a console I/O 760 and a failure management unit 770.

To IF 701, 702, 703 and 704, the PHY 711, 712, 713 and 714 are connected, to the PHY 711, 712, 713 and 714, the MAC 721, 722, 723 and 724 are connected, and to the MAC 721, 722, 723 and 724, the frame switching unit 730 is connected.

Ethernet (registered trademark) frames input from the IF 701, 702, 703 and 704 are applied to the frame switching unit 730 through the PHY 711, 712, 713 and 714 and the MAC 721, 722, 723 and 724, respectively, and with an appropriate output IF determined by operation to be described later at the frame switching unit 730, the frames are output to the IF 701, 702, 703 and 704 through the MAC 721, 722, 723 and 724 and the PHY 711, 712, 713 and 714, respectively.

The PHY 711, 712, 713 and 714, when sensing a failure at the IF 701, 702, 703 and 704 connected thereto, notify the failure management unit 770 of failure information.

The failure management unit 770, which manages a state (normal/failing) of each IF, notifies either or both of the frame switching unit 730 and the CPU 750 of failure occurrence upon receiving the failure information from the PHY 711, 712, 713 and 714.

The CPU 750 and the memory 740, in which a program for controlling operation of the frame switching unit 730 and necessary data are stored, instruct the frame switching unit 730 on control.

The console I/O 760 is an external interface related to setting management of each unit in the device.

Figure 3:
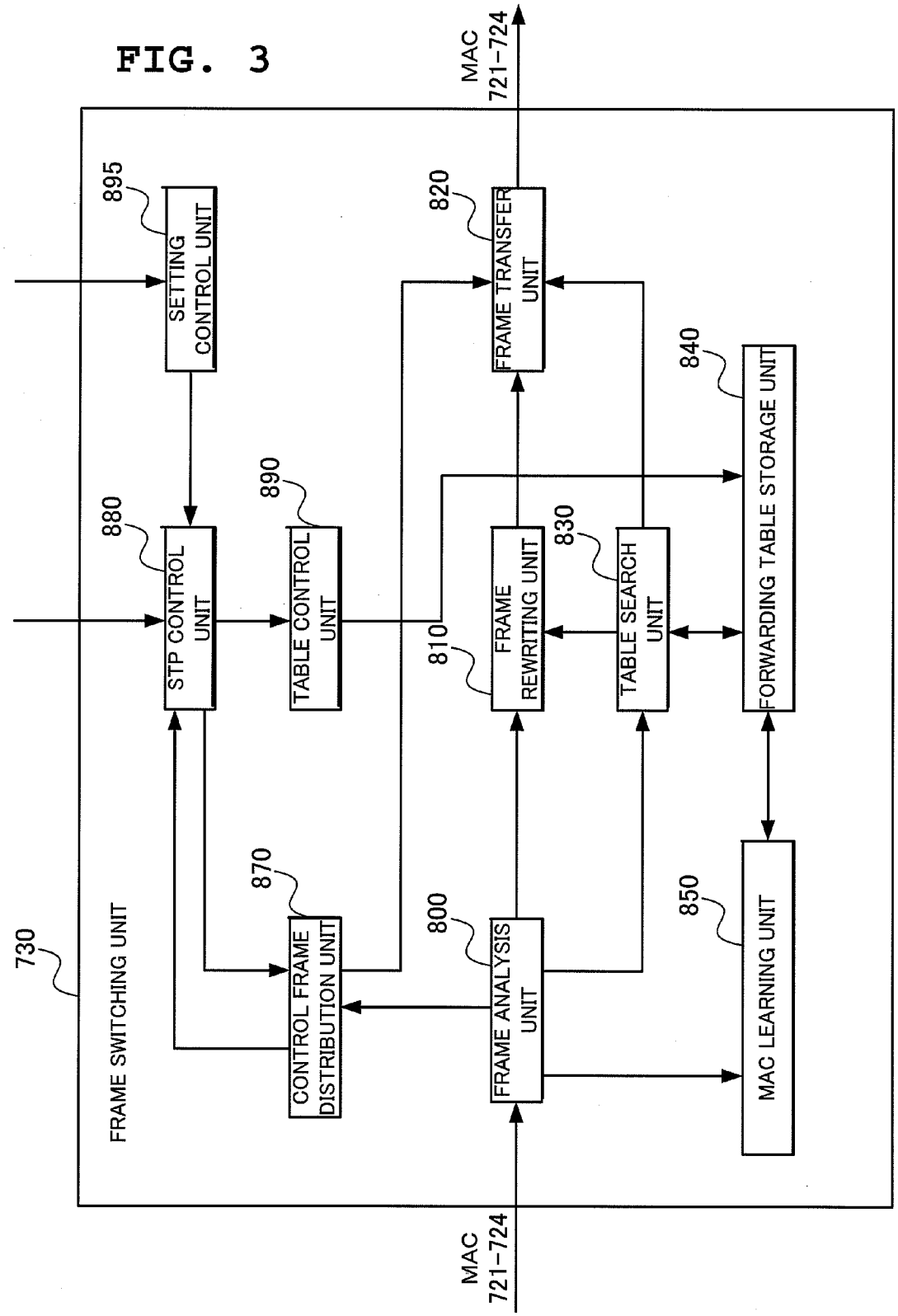
FIG. 3 is a diagram showing a structure of a frame switching unit according to a first exemplary embodiment of the present invention.

FIG. 3 shows a detailed structure of the frame switching unit 730.

The frame switching unit 730 is formed of a frame analysis unit 800, a frame rewriting unit 810, a frame transfer unit 820, a table search unit 830, a forwarding table storage unit 840, a MAC learning unit 850, a control frame distribution unit 870, an STP control unit 880, a table control unit 890 and a setting control unit 895.

The frame switching unit 730 has a function of determining an output IF of an Ethernet (registered trademark) frame input from the MAC 721 through 724 and transferring the same to the MAC 721 through 724 connected to the predetermined IF as described above.

Figure 50:
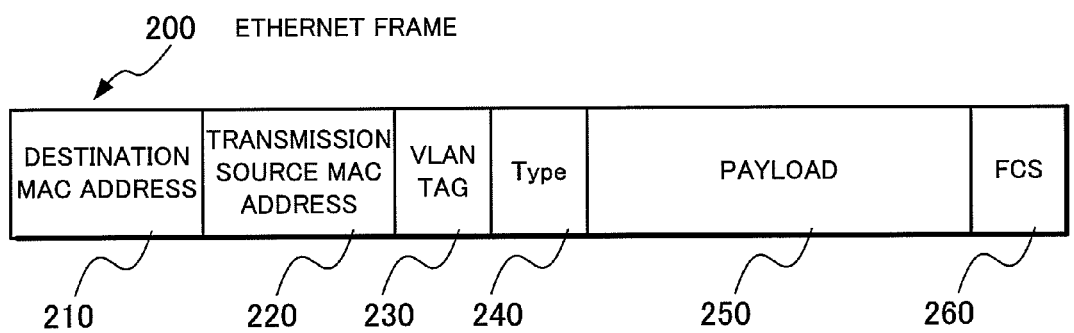
FIG. 50 shows a format of an Ethernet (registered trademark) frame.
Figure 51:
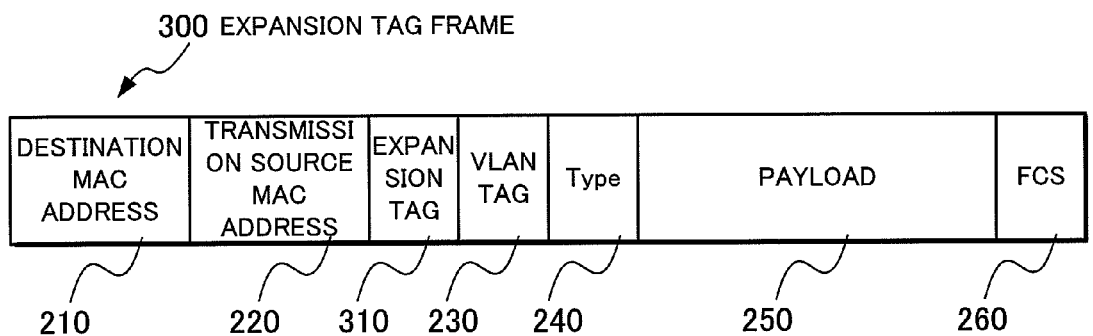
FIG. 51 shows a format of an expansion tag frame.
Figure 52:
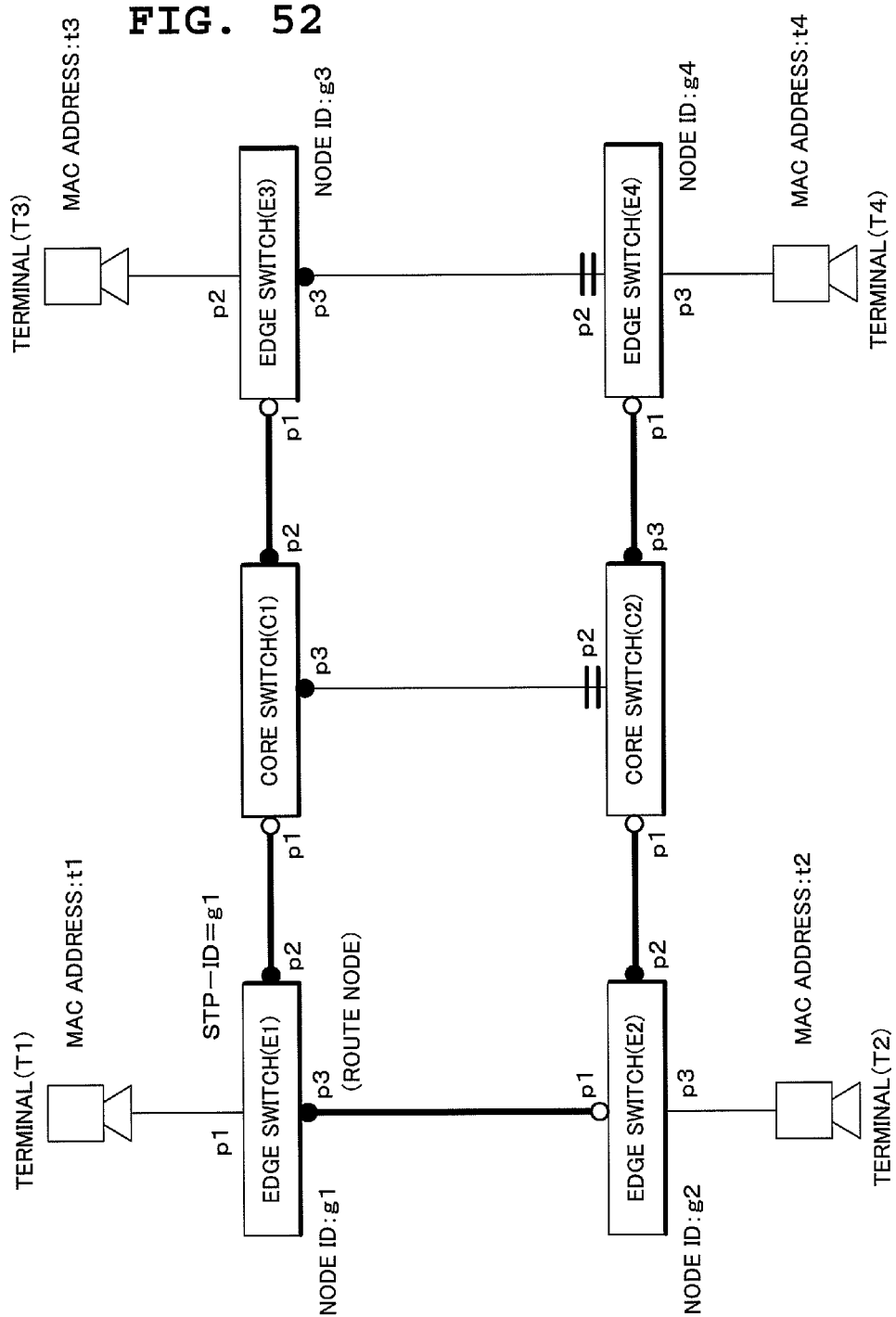
FIG. 52 is a diagram of another network model of wide area Ether according to the related art.
Figure 53:
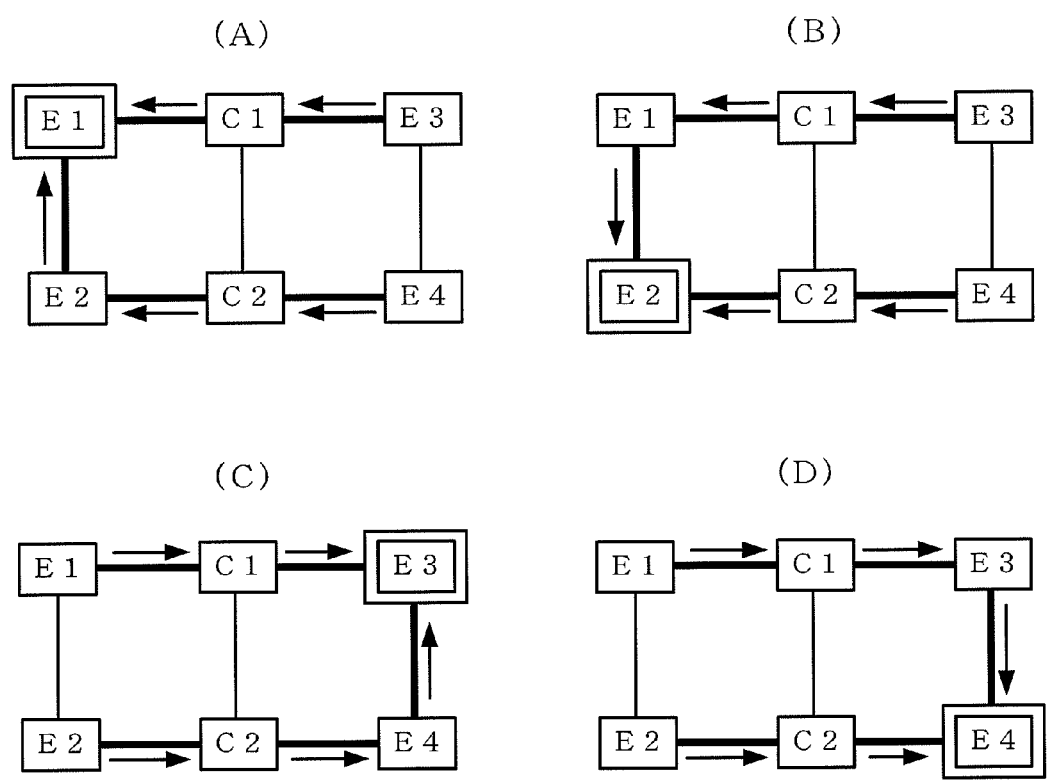
FIG. 53 shows a frame transfer path obtained when using related art.

When the switch 700 is the edge switch E5 E8, kinds of frames to be input/output are any one of the following:

the Ethernet (registered trademark) frame 200 shown in FIG. 50 as input and the expansion tag frame 300 shown in FIG. 51 as output, the expansion tag frame 300 as input and the Ethernet (registered trademark) frame 200 as output and the expansion tag frame 300 as both input and output frames.

In a case where the switch 700 is the core switch C5, C6, kinds of frames to be input/output are the expansion tag frame 300 as both input and output frames.

In the following, each unit of the frame switching unit 730 will be described.

The frame analysis unit 800 analyzes a frame input from the MAC 721 through 724 and when it is a main signal data frame as the ordinary Ethernet (registered trademark) frame 200 or the expansion tag frame 300, transfers header information, frame kind information and input port information to the table search unit 830 and when it is the Ethernet (registered trademark) frame 200, transfers the same also to the MAC learning unit 850. Also transfer the entire frame or a payload part to the frame rewriting unit 810. When the input frame is a control frame, transfer the entire frame to the control frame distribution unit 870.

The frame rewriting unit 810 executes frame rewriting with respect to a main signal data frame received from the frame analysis unit 800 when instructed by the table search unit 830. As frame rewriting, the Ethernet (registered trademark) frame 200 is rewritten into the expansion tag frame 300 by stacking an expansion tag. Alternatively, the expansion tag frame 300 is rewritten into the Ethernet (registered trademark) frame 200 by deleting an expansion tag. After executing any of the foregoing rewriting, or when rewriting is unnecessary, after receiving a frame from the frame analysis unit 800, transfer the frame to the frame transfer unit 820.

As to a main signal data frame, the frame transfer unit 820 transfers a main signal data frame received from the frame rewriting unit 810 to the MAC 721 through 724 corresponding to an output port received from the table search unit 830. As to a control frame, the unit transfers a control frame received from the control frame distribution unit 870 to the MAC 721 through 724 corresponding to an output port received simultaneously.

The table search unit 830 refers to the forwarding table storage unit 840 based on header information, frame kind information and input port information received from the frame analysis unit 800 to obtain output port information and frame rewriting information.

(1) When the frame kind information is the Ethernet (registered trademark) frame 200 and the input port is a port on the user terminal side, refer to a MAC/Tag table 910 (FIG. 6, which will be described later) of the forwarding table storage unit 840 to obtain an expansion tag for MAC_DA, while referring to a Tag table 900 (FIG. 5, which will be described later) to obtain an output port for the expansion tag. Thereafter, notify the frame rewriting unit 810 of the obtained expansion tag to instruct to stack the expansion tag. Also notify the frame transfer unit 820 of the output port information.

(2) When the frame kind information is the expansion tag frame 300 and an input port is a port on the network side, operation varies with a value of the expansion tag which indicates an address of its own node and a value which indicates an address of other node.

(2-1) In a case of other node address, obtain an output port for the expansion tag with reference to the Tag table 900 of the forwarding table storage unit 840. Thereafter, notify the frame transfer unit 820 of the output port information, as well as notifying the frame rewriting unit 810 of no frame rewriting.

(2-2) In a case of its own node address, obtain an output port for MAC_DA and VLAN with reference to a MAC table 920 (FIG. 7, which will be described later) of the forwarding table storage unit 840. Thereafter, notify the frame transfer unit 820 of the output port information, as well as instructing the frame rewriting unit 810 to delete an expansion tag.

When obtaining an output port for an expansion tag with reference to the Tag table 900, there occurs a case where a plurality of output ports are obtained in the present invention. As algorithm for determining an output port for the frame in question from among the plurality of output ports, a common method shown below can be used without a limitation in particular. For example, such algorithm as round robin or weighting round robin can be used. When using weighting round robin, weight assigned to each port may be set with a link rate of the relevant port or the like as a parameter. As another method, an output port may be selected by hashing by using header information of an Ethernet (registered trademark) frame including a destination MAC address and a transmission source MAC address or header information of an IP packet including a destination IP address and a transmission source IP address stored in a payload of an Ethernet (registered trademark) frame, or a combination of these pieces of information.

After determining an output port, notify the frame transfer unit 820 of the determined port.

The forwarding table storage unit 840 has various kinds of tables which store information for transferring a frame. The tables include a Tag table for obtaining an output port from an expansion tag, a MAC/Tag table for obtaining an expansion tag from a MAC address and a VLAN tag, and a MAC table for obtaining an output port from a MAC address and a VLAN tag.

Figure 4:
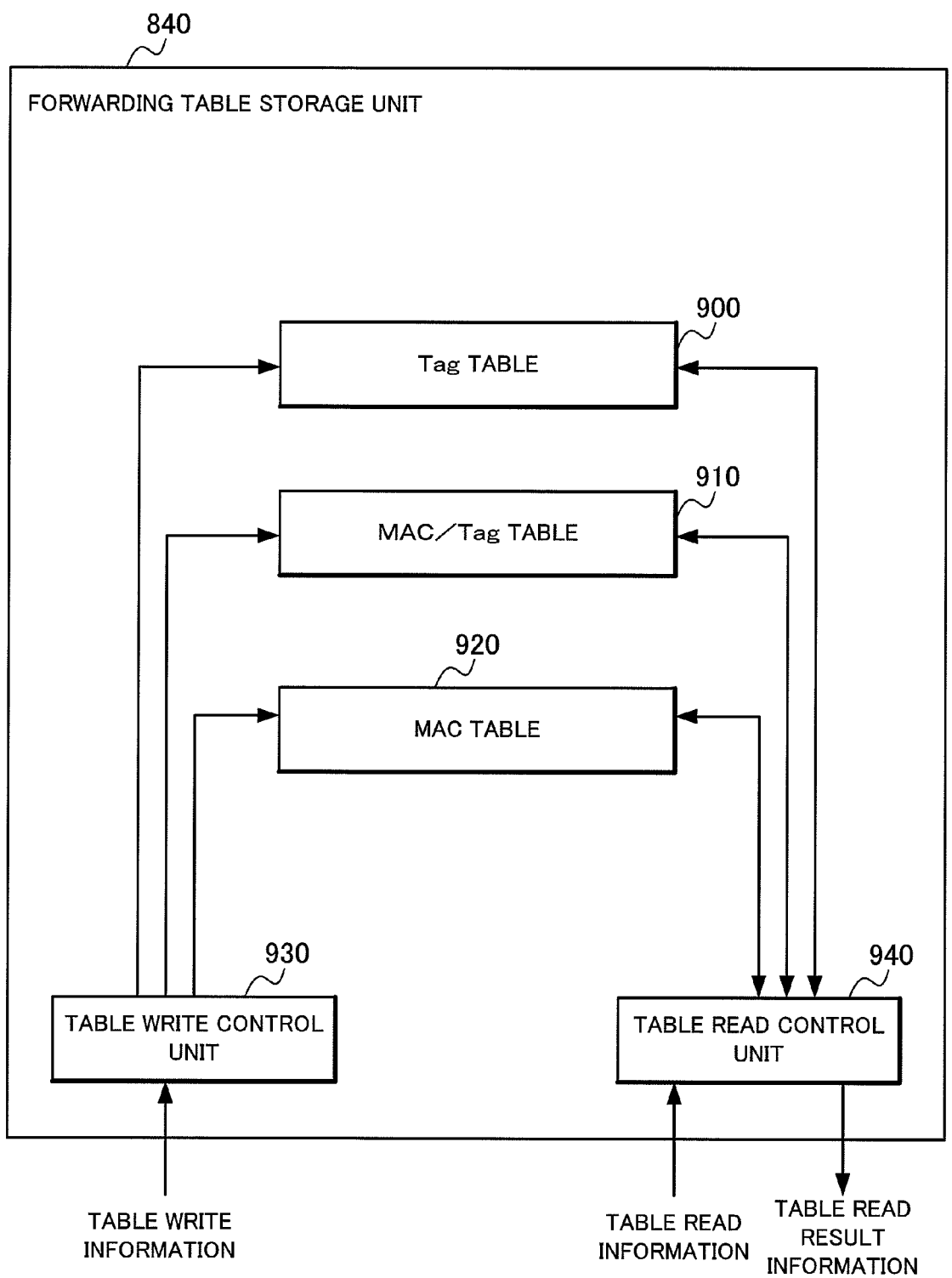
FIG. 4 is a diagram showing a structure of a forwarding table storage unit of the present invention.

FIG. 4 shows an example of a structure of the forwarding table storage unit 840.

The forwarding table storage unit 840 is formed of the Tag table 900, the MAC/Tag table 910, the MAC table 920, a table write control unit 930 and a table read control unit 940. New data write to each table is executed through the table write control unit 930 and data read from each table is executed through the table read control unit 940.

Structures of the Tag table 900, the MAC/Tag table 910 and the MAC table 920 are as shown in FIG. 5, FIG. 6 and FIG. 7, respectively. Table structures are not limited to those shown in FIG. 5, FIG. 6 and FIG. 7, and the MAC/Tag table 910 of FIG. 6 and the Tag table of FIG. 5 may be combined to have an output port for an expansion tag in the MAC/Tag table 910 added, for example.

In the following, description will be made according to the structures shown in FIG. 5, FIG. 6 and FIG. 7.

Upon receiving header information from the frame analysis unit 800, the MAC learning unit 850 refers to the MAC table 920 of the forwarding table storage unit 840 to search for an output port for MAC_SA and VLAN of the received header information and when there exists no entry, stores MAC_SA in a MAC address field, VLAN in a VLAN field and a reception port in an output port field. Here, when the reception port is a port on the network side because of setting, the above-described learning function may be stopped.

The control frame distribution unit 870 transfers a control frame received from the frame analysis unit 800 to a predetermined processing unit, as well as transferring a control frame and output port information received from the processing unit to the frame transfer unit 820. In the present structure, since the processing unit is the STP control unit 880 only, a control frame (hereinafter referred to as Bridge Protocol Data Unit: BPDU) is transferred to the STP control unit 880, while BPDU and the output port information received from the STP control unit 880 are transferred to the frame transfer unit 820.

The STP control unit 880 executes processing of updating port information of STP/RSTP based on BPDU received from the control frame distribution unit 870 or the like to re-generate BPDU and for transferring the same to an adjacent switch, transfers the BPDU and the output port information to the control frame distribution unit 870. The present invention is premised on MSTP in which RSTP is activated for each VLAN, in which port information of RSTP is managed for each VLAN.

As a table for managing the present information, an STP port information management table 1300 shown in FIG. 8 is provided.

Managed for each VLAN, that is, for each tree ID in the STP port information management table 1300 is information about STP related to a port of a corresponding switch.

Managed as port information of STP are a function of a port and a state of the port.

Functions of a port include Root port, Designated port and Alternate port. In FIG. 8, they are denoted as R, D and A, respectively.

States of a port include a Forwarding state, a Learning state and a Discarding state. In FIG. 8, they are denoted as f, l and d, respectively, and denoted in pair as a port function/port state.

When a port state in the STP port state management table 1300 is changed such as at the time of staring RSTP or changing a structure of RSTP, the STP control unit 880 updates the contents of the STP port state management table 1300, as well as extracting, from each tree, a port whose port function is the Root port and whose port state is the Forwarding state (denoted as R/f in FIG. 8) and a port whose port function is the Alternate port (port state is basically the Discarding state although it can be any state, which is denoted as A/d in FIG. 8) to notify the table control unit 890 of a tree ID and a port number of a relevant port.

The table control unit 890 has a function of setting an output port for an expansion tag based on port information of STP notified from the STP control unit 880 (updating the Tag table 900 in the forwarding table storage unit 840).

Upon receiving a tree ID and its corresponding port information (a port number of a port whose port function is the Root port and whose port state is the Forwarding state or a port whose port function is the Alternate port) from the STP control unit 880, the table control unit 890 recites the received port number as an output port in an entry whose expansion tag field has equivalence to the received tree ID in the Tag table 900 in the forwarding table storage unit 840.

The setting control unit 895 receives, through the CPU 750, setting information input via the console I/O 760 shown in FIG. 2 to execute setting processing with respect an appropriate setting unit. More specifically, set an STP parameter or the like in the STP control unit 880.

Figure 9:
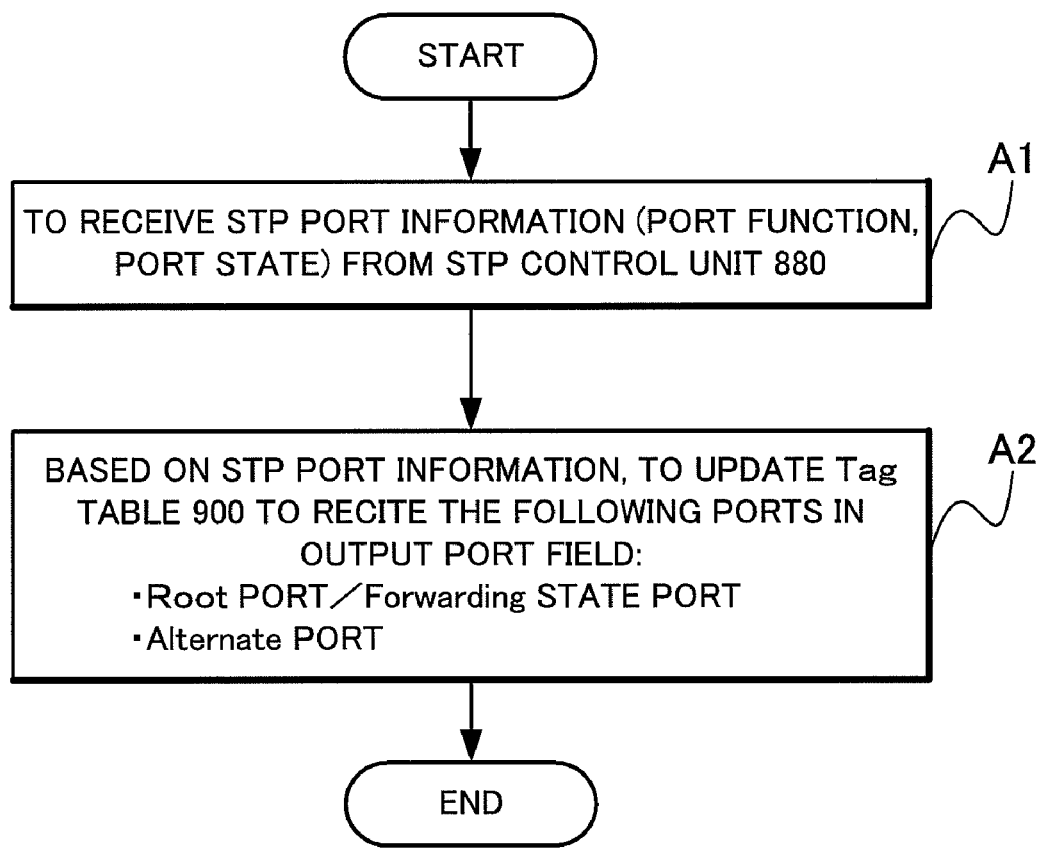
FIG. 9 is a flow chart of setting a Tag table 900 in a table control unit 890 of the present invention.
Figure 10:
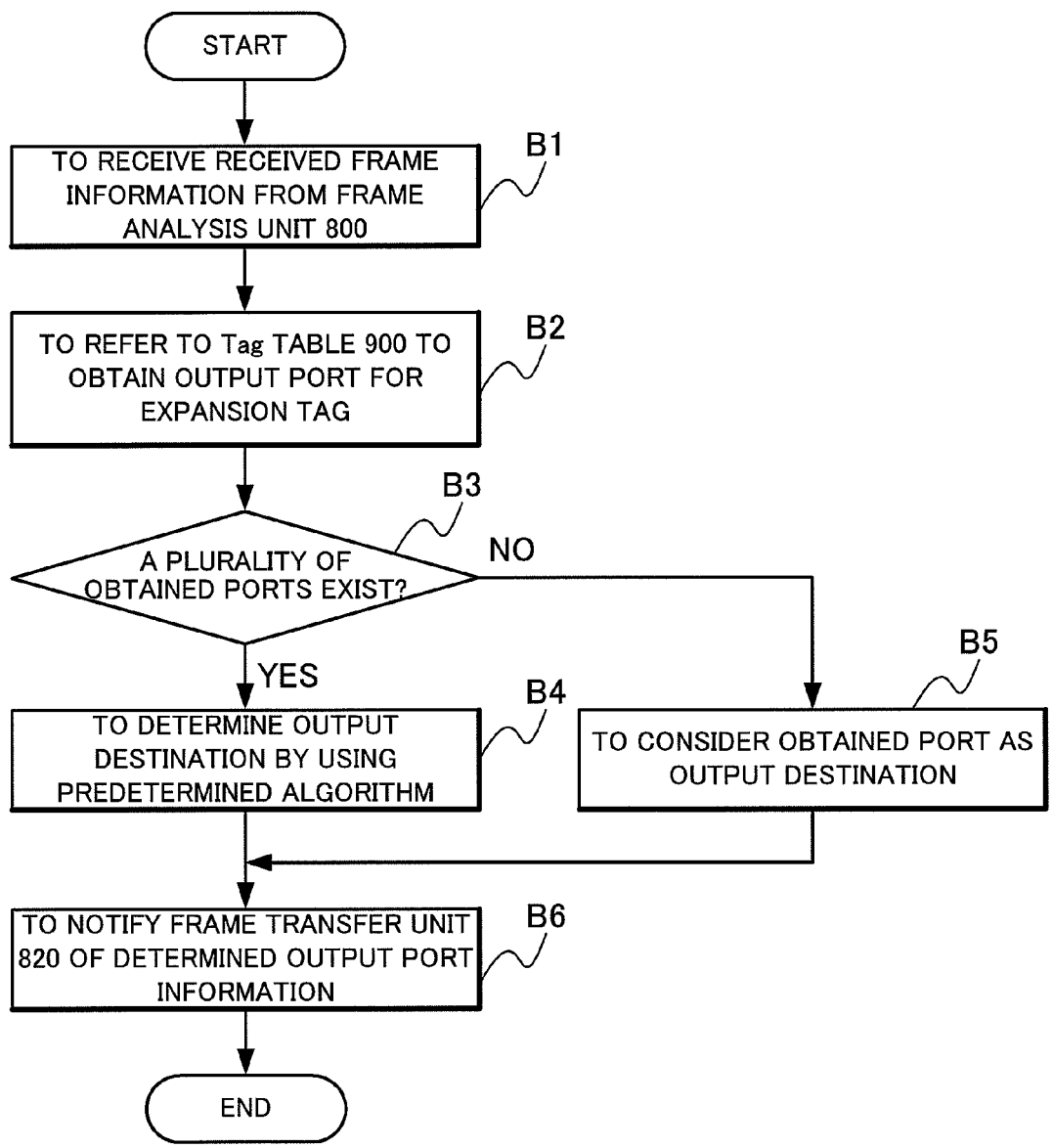
FIG. 10 is a flow chart of determining an output destination of a received frame at a table search unit 830 of the present invention.

Flow chart of setting processing of the Tag table 900 at the table control unit 890 is illustrated in FIG. 9 and a flow chart of received frame output port determination processing at the table search unit 830 is illustrated in FIG. 10, which are characteristic processing of the present invention among the foregoing described respective units.

As shown in FIG. 9, upon receiving STP port information from the STP control unit 880 at Step A1, the table control unit 890 updates the Tag table 900 based on the received STP port information at Step A2.

Also as shown in FIG. 10, upon receiving received frame information from the frame analysis unit 800 at Step B1, the table search unit 830 refers to the Tag table 900 to obtain an output port for an expansion tag at Step B2. Here, when determining whether the obtained output port is singular or plural to find that a plurality of ports exist at Step B3, determine an output destination by using predetermined algorithm with the obtained plurality of ports as a target at Step B4. When determination is made that the obtained port is one port at Step B3, determine the obtained port as an output destination at Step B5. Thereafter, notify the frame transfer unit 820 of the determined output port information at Step B6.

Description will be made of a frame transfer method of the present invention with respect to frame transfer from the terminal T8 to the terminal T5 in the network shown in FIG. 1 which is formed of the edge switches E5 through E8 and the core switches C5 and C6 having the foregoing described structures as an example. Use of the frame transfer method according to the present invention realizes shortest path transfer from the user terminal T8 to the user terminal T5 which is the characteristic of the related art, while use of a link for frame transfer which is not used in the related art enables band use efficiency of the entire network to be improved.

In FIG. 1, since the terminal T5 is a destination terminal, an RSTP tree whose route node is the edge switch E5 to which the terminal T5 connects will be a path of frame transfer. With g5 as STP-ID of the tree, the present tree is identified by VLAN=g5. The STP port state management table 1300 in each switch in this case is as shown in FIG. 11 (A) through (F), in which reference numerals 1401, 1402, 1403, 1404, 1405 and 1406 are assigned to the edge switches E5, E6, E7 and E8 and the core switches C5 and C6, respectively. Illustrated here is only an RSTP tree whose route node is the edge switch E5. In practice, information related to a tree with other node as a route node is also provided.

With reference to FIG. 1, in frame transfer from the terminal T8 to the terminal T5, a frame arrives at the terminal T5 via a transfer path through the edge switch E8, the core switch C6, the edge switch E6 and the edge switch E5 according to the related art, while it arrives at the terminal T5 also using a transfer path on which it is transferred from the edge switch E8 to the edge switch E7 and then through the core switch C5 and the edge switch E5 and a transfer path on which it is transferred from the core switch C6 to the core switch C5 and then through the edge switch E5 due to output to the Alternate port which is the characteristic of the present invention. Table contents and table setting procedures executed at each switch for realizing the foregoing operation will be described.

Tables of the edge switch E8 are illustrated in the lump in FIG. 12 (A) through (D).

In the edge switch E8, the STP control unit 880 has the STP port state management table 1404.

When the port state of the STP becomes stable, the STP control unit 880 refers to the STP port state management table 1404 to notify the table control unit 890 of VLAN=g5 and the port 1 whose port function is the Root port and whose port state is the Forwarding state and VLAN=g5 and the port 2 whose port function is the Alternate port.

In the Tag table 900 of the forwarding table storage unit 840, the table control unit 890 sets the ports p1 and p2 which are notified from the STP control unit 880 as an output port for the expansion tag=g5.

The resultant Tag table 900 will be a Tag table 1501 shown in FIG. 12 (B).

Since according to the present invention, the MAC/Tag table 910 and the MAC table 920 of the forwarding table storage unit 840 may be statically set or automatically set by a control frame or the like, description will be made of a state as of after setting for the purpose of simplification of the description.

In FIG. 12, both tables are registered as a MAC/Tag table 1502 and a MAC table 1503.

Subsequently, description will be made of a table of the core switch C6 as a node at a hop subsequent to the edge switch E8 on the transfer path with reference to FIG. 13.

In the core switch C6, the STP control unit 880 has the STP port state management table 1406 shown in FIG. 13(A).

The STP control unit 880 sets the Tag table according to the STP port state by the same processing as that described above with respect to E8. More specifically, when the port state of the STP becomes stable, the STP control unit 880 refers to the STP port state management table 1406 to notify the table control unit 890 of VLAN=g5 and the port 1 whose port function is the Root port and whose port state is the Forwarding state and VLAN=g5 and the port 2 whose port function is the Alternate port.

In the Tag table 900 of the forwarding table storage unit 840, the table control unit 890 sets the ports p1 and p2 notified from the STP control unit 880 as an output port for the expansion tag=g5. The resultant Tag table 900 will be a Tag table 1601 as shown in FIG. 13(B). The core switch C6 fails to have the MAC/Tag table 910 and the MAC table 920.

Subsequently, description will be made of a table of the edge switch E6 as a node at a hop subsequent to the core switch C6 on the transfer path with reference to FIG. 14 (A) through (D).

In the edge switch E6, the STP control unit 880 has the STP port state management table 1402 as shown in FIG. 14(A). Similarly to the above-described edge switch E8, when the port state of the STP becomes stable, the STP control unit 880 refers to the STP port state management table 1402 to notify the table control unit 890 of VLAN=g5 and the port 1 whose port function is the Root port and whose port state is the Forwarding state. Since there fails to exist the Alternate port as the port function, no notification will be made thereof.

In the Tag table 900 of the forwarding table storage unit 840, the table control unit 890 sets the port p1 notified from the STP control unit 880 as an output port for the expansion tag=g5. The resultant Tag table 900 will be a Tag table 1701 as shown in FIG. 14(B). The MAC/Tag table 910 and the MAC table 920 of the forwarding table storage unit 840 have such registration as those of a MAC/Tag table 1702 and a MAC table 1703 shown in FIGS. 14 (C) and (D).

Subsequently, description will be made of a table of the edge switch E5 as a node at a hop subsequent to the edge switch E6 and as the last stage node on the transfer path with reference to FIG. 15 (A) through (D).

In the edge switch E5, the STP control unit 880 has the STP port state management table 1401 as shown in FIG. 15(A).

Similarly to the above-described respective switches, when the port state of the STP becomes stable, the STP control unit 880 refers to the STP port state management table 1401 to notify a port meeting the condition. In this case, since the edge switch E5 is an Egress edge switch of the present transfer and a route node of the tree, there exists no port whose port function is the Root port and whose port state is the Forwarding state or no port whose port function is the Alternate port, so that nothing is notified (i.e. since the edge switch E5 is an Egress edge switch of the present transfer, setting of an output port for a subsequent hop is unnecessary). The MAC/Tag table 910 and the MAC table 920 of the forwarding table storage unit 840 have such registration as those of a MAC/Tag table 1802 and a MAC table 1803 shown in FIGS. 15 (C) and (D).

As described above, since output to the Alternate port is also executed in the present invention, frames are transferred from the edge switch E8 to the edge switch E7 and from the core switch C6 to the core switch C5. Tables of the edge switch E7 and the core switch C5 are as shown in FIG. 16 (A) through (D) and FIGS. 17 (A) and (B), respectively. Since the method of updating Tag tables 1901 and 2001 based on the STP state management tables 1403 and 1405 is the same as that of the edge switches E5, E6 and E8 and the core switch C6 which have been described so far, no detailed description will be made thereof.

In the following, description will be made of frame transfer processing at each switch in a state where the foregoing described table setting is made with reference to the diagram of a node structure shown in FIG. 3 and the tables in FIG. 12 through FIG. 17.

Figure 18:
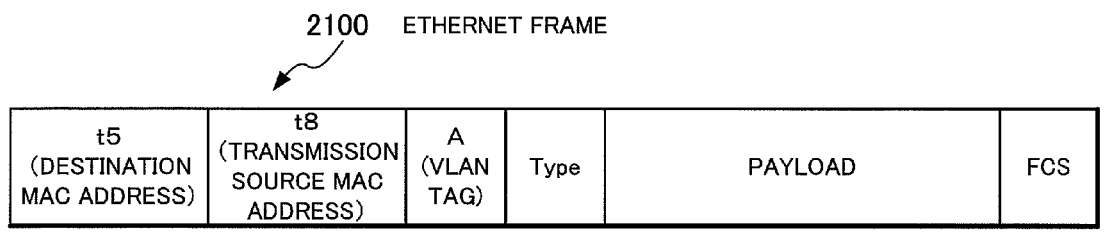
FIG. 18 shows one example of an Ethernet (registered trademark) frame.

The edge switch E8 having received an Ethernet (registered trademark) frame 2100 directed to the terminal T5 from the terminal T8 shown in FIG. 18 analyzes that the input frame is an ordinary Ethernet (registered trademark) frame 200 at the frame analysis unit 800 to notify the table search unit 830 of header information, frame kind information and input port information and notify the frame rewriting unit 810 of the entire frame or the payload part.

Since the received frame is the Ethernet (registered trademark) frame 200 and the input port is a port on the user terminal side, the table search unit 830 refers to the MAC/Tag table 1502 to obtain an expansion tag g5 for the destination MAC address t5 and VLAN=A and instructs the frame rewriting unit 810 to execute expansion tag stacking processing. Also obtain the output ports p1 and p2 for the expansion tag g5 with reference to the Tag table 1501. Thereafter, with the obtained ports p1 and p2 as a target, determine an output destination port by a predetermined method to notify the frame transfer unit 820 of the port.

Predetermined method may be algorithm such as round robin or weighting round robin as described above, or a method of selecting an output port by hashing by using header information of an Ethernet (registered trademark) frame including a destination MAC address and a transmission source MAC address or header information of an IP packet including a destination IP address and a transmission source IP address stored in a payload of an Ethernet (registered trademark) frame, or a combination of these pieces of information.

Figure 19:
FIG. 19 shows one example of an expansion tag frame.

The frame rewriting unit 810 executes the processing of stacking the expansion tag g5 instructed by the table search unit 830 with respect to a frame or a payload received from the frame analysis unit 800. As a result, a frame to be output will be an expansion tag frame 2200 shown in FIG. 19. After rewriting the frame, the frame rewriting unit 810 transfers the expansion tag frame 2200 to the frame transfer unit 820.

The frame transfer unit 820 outputs the expansion tag frame 2200 to the output p1 or p2 received from the table search unit 830. In line with frame transfer processing described here, learning processing is also executed.

The frame analysis unit 800 notifies the frame rewriting unit 810 and the table search unit 830 of information, as well as notifying the MAC learning unit 850 of header information, frame kind information and input port information.

The MAC learning unit 850 having received the information refers to the MAC table 1502 to search for an output port for MAC_SA=t8 and VLAN=A of the received header information and when there exists no relevant entry, stores MAC_SA=t8 in the MAC address field, VLAN=A in the VLAN field and the reception port p3 in the output port field. As described above, a table state as of after the completion of the learning processing is described in the MAC table 1503 in the present exemplary embodiment.

Subsequently, the core switch C6 at a subsequent hop which is connected on the side of the port p1 of the edge switch E8 will be described.

The core switch C6 having received the expansion tag frame 2200 from the edge switch E8 analyzes that the input frame is the expansion tag frame 300 at the frame analysis unit 800 to notify the table search unit 830 of header information, frame kind information and input port information and notify the frame rewriting unit 810 of the entire frame or a payload part.

Since the received frame is the expansion tag frame 300, the input port is a port on the network side and the value of the expansion tag is a node ID of other node, the table search unit 830 refers to the Tag table 1601 to obtain the output ports p1 and p2 for the expansion tag g5. Thereafter, with the obtained ports p1 and p2 as a target, determine an output destination port by a predetermined method. Thereafter, notify the frame rewriting unit 810 of no frame rewriting and notify the frame transfer unit 820 of the determined output port p1 or p2.

The frame rewriting unit 810 transfers the expansion tag frame 2200 received from the frame analysis unit 800 to the frame transfer unit 820 without rewriting processing.

The frame transfer unit 820 outputs the expansion tag frame 2200 to the output port p1 or p2 received from the table search unit 830. Since the present switch is a core switch, no learning processing is executed.

Subsequently, description will be made of the edge switch E6 at a subsequent hop which is connected on the side of the port p1 of the core switch C6.

The edge switch E6 having received the expansion tag frame 2200 from the core switch C6 analyzes that the input frame is the expansion tag frame 300 at the frame analysis unit 800 to notify the table search unit 830 of header information, frame kind information and input port information and notify the frame rewriting unit 810 of the entire frame or a payload part.

Since the received frame is the expansion tag frame 300, the input port is a port on the network side and the value of the expansion tag is a node ID of other node, the table search unit 830 refers to the Tag table 1701 to obtain the output ports p1 for the expansion tag g5. Thereafter, notify the frame rewriting unit 810 of no frame rewriting and notify the frame transfer unit 820 of the output port p1.

The frame rewriting unit 810 transfers the expansion tag frame 2200 received from the frame analysis unit 800 to the frame transfer unit 820 without rewriting processing.

The frame transfer unit 820 outputs the expansion tag frame 2200 to the output port p1 received from the table search unit 830. Although the present switch is an edge switch, because the reception port of the frame is a port on the network side, no learning processing is executed.

Subsequently, description will be made of the edge switch E5 at a hop subsequent to the edge switch E6.

The edge switch E5 having received the expansion tag frame 2200 from the edge switch E6 analyzes that the input frame is the expansion tag frame 300 at the frame analysis unit 800 to notify the table search unit 830 of header information, frame kind information and input port information and notify the frame rewriting unit 810 of the entire frame or a payload part.

Since the received frame is the expansion tag frame 300, the input port is a port on the network side and the value of the expansion tag is a node ID of its own node, the table search unit 830 instructs the frame rewriting unit 810 to execute expansion tag deletion processing, as well as referring to the MAC table 1803 to obtain the output port p1 for MAC_DA=t5 and VLAN=A and notify the frame transfer unit 820 of the port.

The frame rewriting unit 810 executes deletion processing of the expansion tag instructed by the table search unit 830 with respect to the frame or payload received from the frame analysis unit 800. As a result, frame to be output will be the Ethernet (registered trademark) frame 2100 shown in FIG. 18.

When the frame rewriting unit 810 transfers the Ethernet (registered trademark) frame 2100 to the frame transfer unit 820, the frame transfer unit 820 outputs the Ethernet (registered trademark) frame 2100 to the output port p1 received from the table search unit 830. Although the present switch is an edge switch, because the frame reception port is a port on the network side, no learning processing is executed.

Subsequently, description will be made of processing of a reception switch with respect to a frame output to the side of the port p2 of the edge switch E8 and a frame output to the side of the port p2 of the core switch C6.

The edge switch E7 having received the expansion tag frame 2200 output to the side of the port p2 of the edge switch E8 analyzes that the input frame is the expansion tag frame 300 at the frame analysis unit 800 to notify the table search unit 830 of header information, frame kind information and input port information and notify the frame rewriting unit 810 of the entire frame or a payload part.

Since the received frame is the expansion tag frame 300, the input port is a port on the network side and the value of the expansion tag is a node ID of other node, the table search unit 830 refers to the Tag table 1901 to obtain the output port p1 for the expansion tag g5. Thereafter, notify the frame rewriting unit 810 of no frame rewriting and notify the frame transfer unit 820 of the output port p1.

The frame rewriting unit 810 transfers the expansion tag frame 2200 received from the frame analysis unit 800 to the frame transfer unit 820 without rewriting processing.

The frame transfer unit 820 outputs the expansion tag frame 2200 to the output port p1 received from the table search unit 830. Although the present switch is an edge switch, because a reception port of the frame is a port on the network side, no learning processing is executed.

Subsequently, description will be made of the core switch C5 having received the expansion tag frame 2200 output to the side of the port p2 of the core switch C6.

The core switch C5 also receives the expansion tag frame 2200 from the edge switch E7 together with that from the core switch C6.

Upon receiving the expansion tag frame 2200 from the core switch C6 and the edge switch E7, the core switch C5 analyzes that the input frame is the expansion tag frame 300 at the frame analysis unit 800 to notify the table search unit 830 of header information, frame kind information and input port information and notify the frame rewriting unit 810 of the entire frame or a payload part.

Since the received frame is the expansion tag frame 300, the input port is a port on the network side and the value of the expansion tag is a node ID of other node, the table search unit 830 refers to the Tag table 2001 to obtain the output port p1 for the expansion tag g5. Thereafter, notify the frame rewriting unit 810 of no frame rewriting and notify the frame transfer unit 820 of the output port p1.

The frame rewriting unit 810 transfers the expansion tag frame 2200 received from the frame analysis unit 800 to the frame transfer unit 820 without rewriting processing.

The frame transfer unit 820 outputs the expansion tag frame 2200 to the output port p1 received from the table search unit 830. Because the present switch is a core switch, no learning processing is executed.

Subsequently, the edge switch E5 at a hop subsequent to the core switch C5 executes the same processing as the above-described processing to convert the expansion tag frame 2200 into the Ethernet (registered trademark) frame 2100, as well as outputting the Ethernet (registered trademark) frame 2100 to the port p1, so that the frame arrives at the user terminal T5 as a destination.

As described in the foregoing, the Ethernet (registered trademark) frame 2200 sent from the user terminal T8 to the user terminal T5 is allowed to arrive at the user terminal T5 as a destination by a shortest path through the edge switch E8, the core switch C6, the edge switch E6 and the edge switch E5 according to the related art, while it is also allowed to arrive at the user terminal T5 as a destination by using a path through the edge switch E8, the edge switch E7, the core switch C5 and the edge switch E5 or a path through the core switch C6, the core switch C5 and the edge switch E5 as a characteristic of the present invention.

In other words, according to the present invention, a frame is transferred also to the Alternate port. In the related art RSTP, the Alternate port is a port which enters the blocking state in order to prevent looping, so that enabling the Alternate port to transfer a frame might cause a frame to circulate on a formed loop.

On the other hand, according to the present invention, even when the Alternate port is enabled to transfer a frame, an opposing node having received a transferred frame transfers the received frame to the Root port. In other words, the frame is transferred one way toward the Root node of the tree. Therefore, even when a loop is formed as a logical path, the frame will be transferred only one way toward the Root node and will not circulate on the loop, thereby enabling transfer of a frame to the Alternate port.

As a result, a link between the edge switch E8 and the edge switch E7 and a link between the core switch C6 and the core switch C5 which are not used in the related art can be used for frame transfer, which improves band use efficiency in the network as a whole.

Subsequently, description will be made of frame transfer when a failure occurs in the network.

Figure 20:
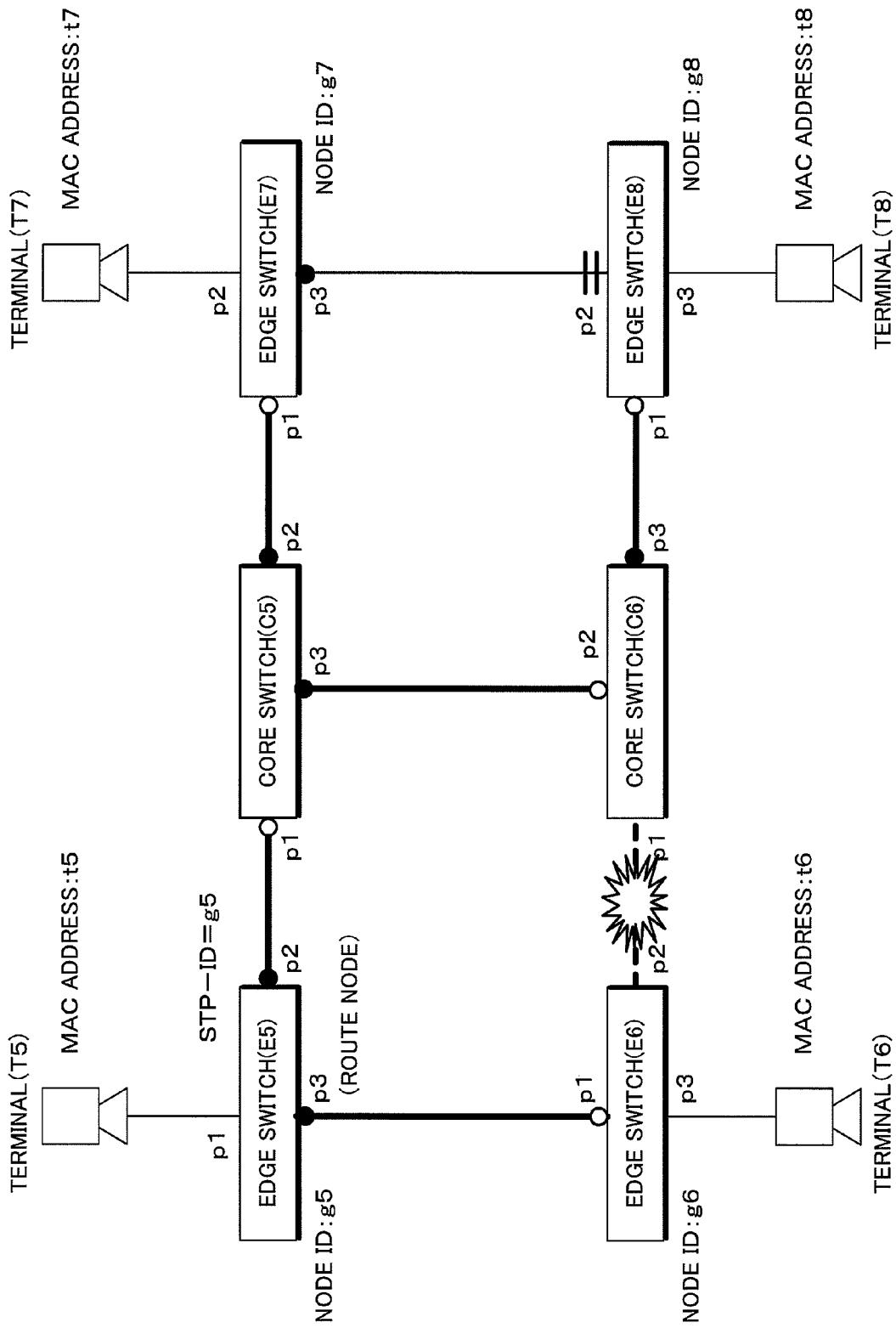
FIG. 20 is a diagram of a network model of wide area Ether in a case of failure occurrence according to the present invention.

As one example of a failure, which is a change occurring in transfer to a link on the Alternate port side which is a characteristic of the present invention, description will be here made of a case where a failure occurs on a link between the core switch C6 and the edge switch E6 as shown in FIG. 20.

When there occurs a failure on the link between the core switch C6 and the edge switch E6 in the network shown in FIG. 1, RSTP re-structuring processing starts triggered by failure detection at opposite nodes of the failing part. Since the processing is conformed to standard operation of RSTP, no detailed description will be made thereof. Assume that the state becomes stable as shown in the configuration of FIG. 20 as a result of re-structuring.

Here, the core switch C6 and the edge switch E6 has a change in the port information of a tree due to re-structuring. As to the core switch C6, the port state shown in the STP state management table 1406 in FIG. 13 changes to the port state shown in an STP state management table 2400 in FIG. 21 as a result of re-structuring of the tree.

In the core switch C6, when the port state of the STP becomes stable, the STP control unit 880 refers to the STP port state management table 2400 to notify the table control unit 890 of VLAN=g5 and the port 2 whose port function is the Root port and whose port state is the Forwarding state.

The table control unit 890 sets the port p2 notified by the STP control unit 880 as an output for the expansion tag g5 in the Tag table 900 of the forwarding table storage unit 840. As a result, the Tag table 900 changes to a Tag table 2401 as shown in FIG. 21.

Also in the edge switch E6, the Tag table is updated according to the change of the port state of the STP. Updated table is as shown in FIG. 22 (although in FIG. 22, an STP state management table 2500 is changed from the STP state management table 1402 shown in FIG. 14, none of the other tables are changed because the Root port has no change).

Description will be made of frame transfer processing to be executed when the table is updated at a time of failure occurrence as described in the foregoing. Since related to the above-described transfer from the user terminal T8 to T5, only the core switch C6 has a table change, description will be made of transfer processing at the core switch C6.

The core switch C6 having received the expansion tag frame 2200 from the edge switch E8 analyzes that the input frame is the expansion tag frame 300 at the frame analysis unit 800 to notify the table search unit 830 of header information, frame kind information and input port information and notify the frame rewriting unit 810 of the entire frame or a payload part.

Since the received frame is the expansion tag frame 300, the input port is a port on the network side and the value of the expansion tag is a node ID of other node, the table search unit 830 refers to the Tag table 1601 to obtain the output port p2 for the expansion tag g5. Thereafter, notify the frame rewriting unit 810 of no frame rewriting and notify the frame transfer unit 820 of the output port p2.

The frame rewriting unit 810 transfers the expansion tag frame 2200 received from the frame analysis unit 800 to the frame transfer unit 820 without rewriting processing.

The frame transfer unit 820 outputs the expansion tag frame 2200 to the output port p2 received from the table search unit 830.

Unlike before a failure occurs, the core switch C6 outputs all the frames received from the edge switch E8 to the port p2, so that the frames arrive at the destination user terminal T5 through the core switch C5 and the edge switch E5.

As described in the foregoing, because even when a failure occurs, after a port state of a tree is updated according to an RSTP procedure, an output port of a Tag table is set based on new port information to transfer a frame according to the output port of the Tag table at the time of frame transfer, frame transfer is enabled by the same processing as that of an ordinary state.

Effects of the First Exemplary Embodiment

As described in the present exemplary embodiment in the foregoing, the Ethernet (registered trademark) frame 2200 sent from the user terminal T8 to the user terminal T5 is allowed to arrive at the user terminal T5 as a destination by a shortest path through the edge switch E8, the core switch C6, the edge switch E6 and the edge switch E5 according to the related art, while it is also allowed to arrive at the user terminal T5 as a destination by a path through the edge switch E8, the edge switch E7, the core switch C5 and the edge switch E5 or a path through the core switch C6, the core switch C5 and the edge switch E5 as a characteristic of the present invention. Even when a failure occurs, the shortest path transfer is enabled according to a tree configuration as of after the failure, while transfer is enabled by using a link which is not used in the related art.

More specifically, according to the foregoing described node structure, table generation method and data transfer method, in the edge switch E8 and the core switch C6, not only the Root port in the Forwarding state but also the Alternate port are set as an output port in the Tag table as shown in the STP state management table 1404 and the Tag table 1501 in FIG. 12 and the STP state management table 1406 and the Tag table 1601 in FIG. 13 to transfer frames to a plurality of output ports while distributing loads.

This allows the link between the edge switch E8 and the edge switch E7 and the link between the core switch C6 and the core switch C5 which are links yet to be used in the related art to be used for frame transfer, thereby improving band use efficiency in the network as a whole.

Moreover, since the Alternate port to which transfer is newly allowed is a port whose cost for a Root node is the second smallest to the Root port, a path reaching the destination Root node through the link on the Alternate port side by which frame transfer is newly allowed is a path whose cost is equivalent or is second to the shortest path according to the related art, so that frame transfer of the present invention can be realized by the shortest path while distributing loads.

As a result, the frame transfer method of the present invention enables band use efficiency of the network as a whole to be improved by using a link not used in the network in the related art while executing shortest path transfer.

Second Exemplary Embodiment

Second exemplary embodiment of the present invention will be described in detail with reference to the drawings.

Figure 23:
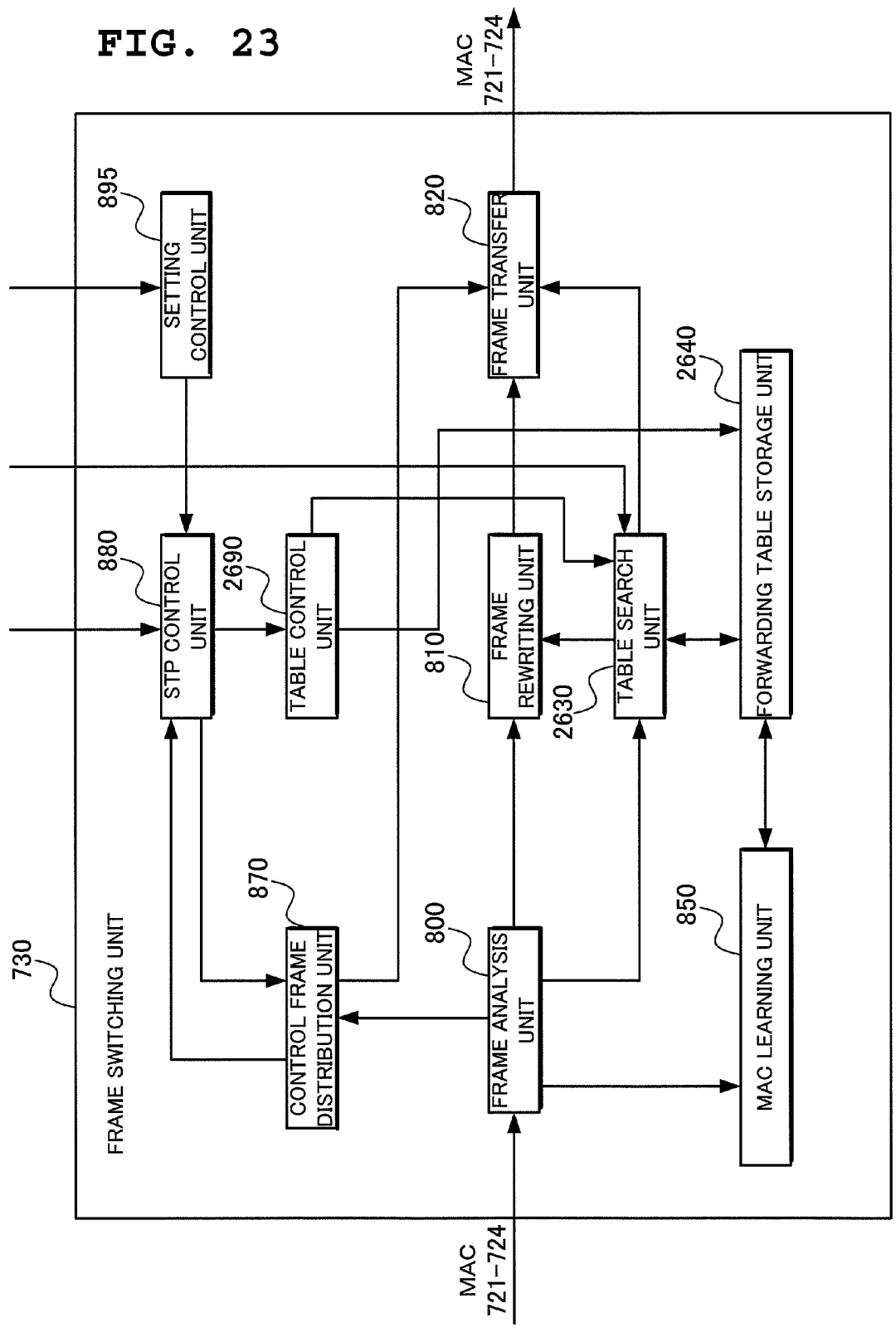
FIG. 23 is a diagram showing a structure of a frame switching unit according to a second exemplary embodiment of the present invention.

FIG. 23 shows a detailed structure of the frame switching unit 730 according to the present exemplary embodiment. Shown in FIG. 23 is the frame switching unit 730 according to the first exemplary embodiment shown in FIG. 3, in which the forwarding table storage unit 840 is replaced by a forwarding table storage unit 2640, and accordingly the table control unit 890 by a table control unit 2690 and the table search unit 830 by a table search unit 2630. In the following, description will be mainly made of a difference from the first exemplary embodiment.

First, the forwarding table storage unit 2640 will be described.

Figure 24:
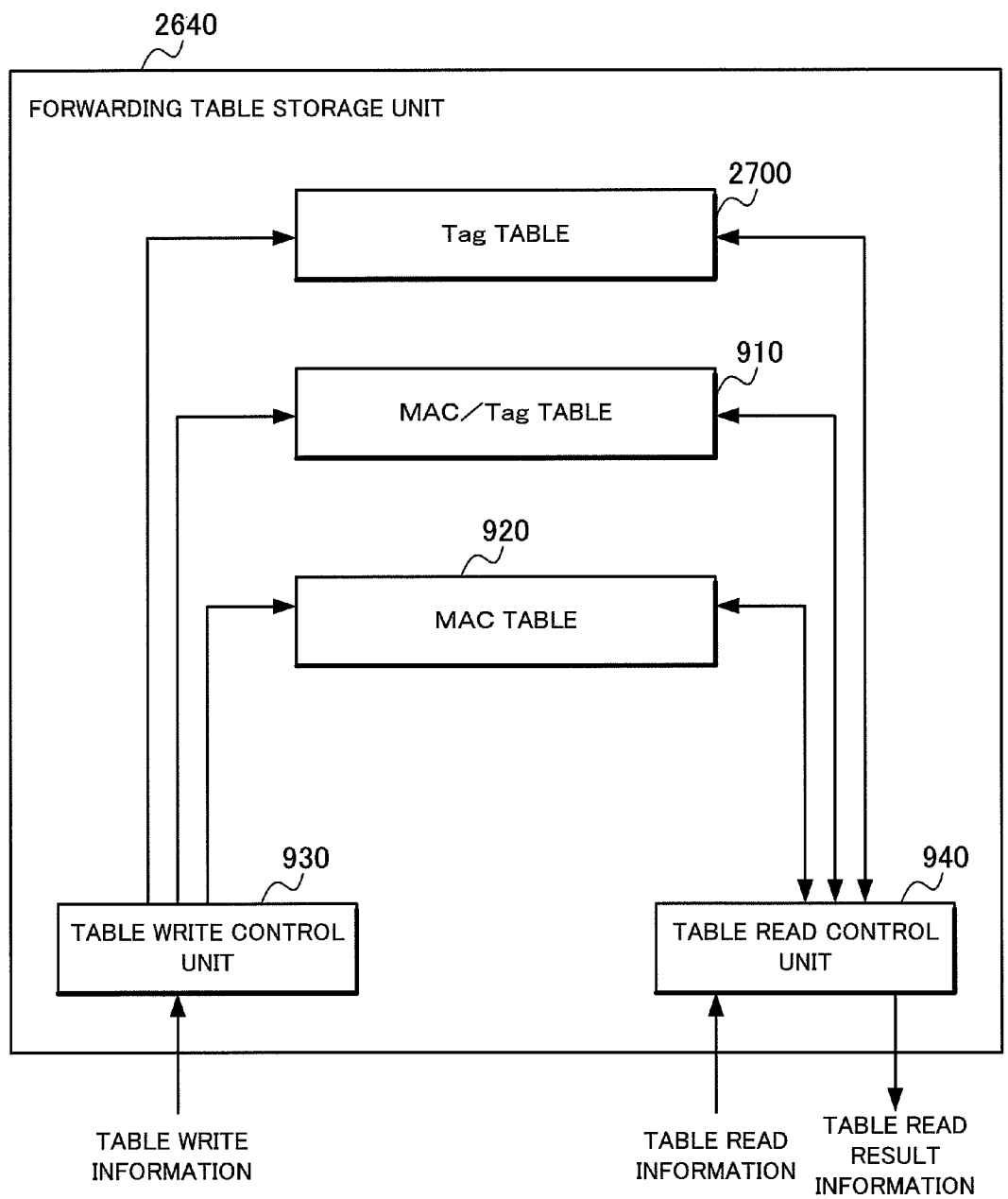
FIG. 24 is a diagram showing another structure of a forwarding table storage unit according to the present invention.

Shown in FIG. 24 is a structure example of the forwarding table storage unit 2640.

In comparison with the forwarding table storage unit 840 according to the first exemplary embodiment described with reference to FIG. 4, the forwarding table storage unit 2640 has a Tag table 2700 replacing the Tag table 900. Structure of the Tag table 2700 is as shown in FIG. 25.

Figures 25, 26:
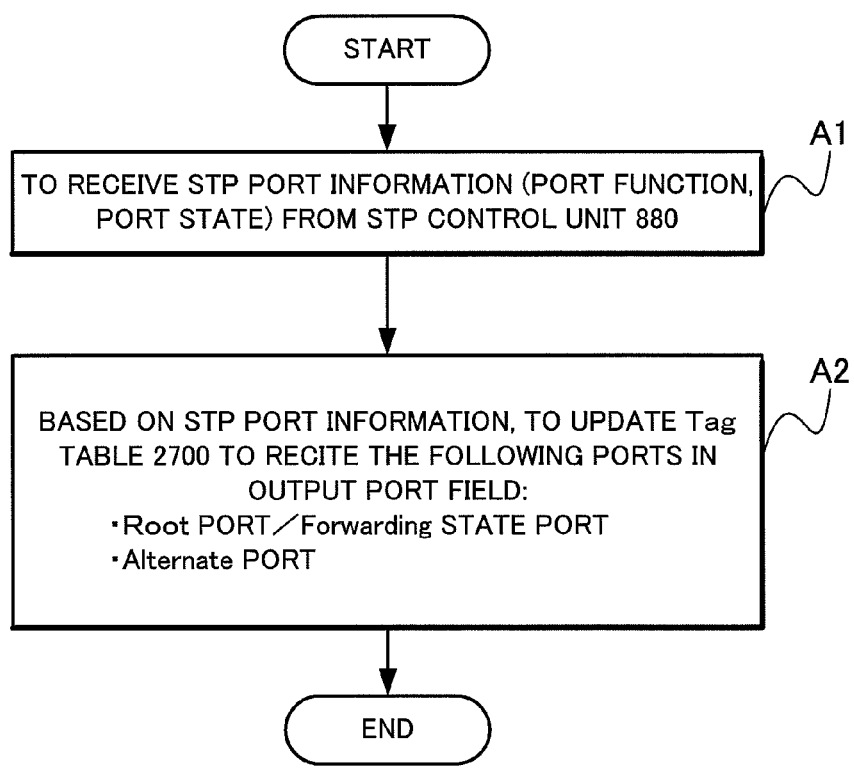
FIG. 25 is another example of a Tag table according to the present invention.
FIG. 26 is a flow chart of setting a Tag table 2700 at a table control unit 2690 of the present invention.

Similarly to the Tag table 900 according to the first exemplary embodiment which manages an output port for an expansion tag, the Tag table 2700 also manages an output port for an expansion tag as shown in FIG. 25.

Subsequently, the table control unit 2690 will be described.

Similarly to the table control unit 890, the table control unit 2690 sets an output port for an expansion tag based on the STP port information notified by the STP control unit 880.

Upon receiving port information corresponding to a tree ID from the STP control unit 880, that is, a port number of a port whose port function is the Root port and whose port state is the Forwarding state or a port whose port function is the Alternate port, the table control unit 2690 recites, in an entry whose expansion tag field has the equivalence to the received tree ID in the Tag table 2700 in the forwarding table storage unit 840, the port number of the port whose port function is the Root port and whose port state is the Forwarding state and the port number of the port whose port function is the Alternate port as an output port.

Subsequently, the table search unit 2630 will be described.

The table search unit 2630 executes the same processing as the processing of obtaining an output port for an expansion tag with reference to the Tag table 900 by the table search unit 830. More specifically, while the table search unit 830 obtains one or a plurality of ports stored in the output port field of the Tag table 900, the table search unit 2630 obtains one or a plurality of ports stored in the output port field of the Tag table 2700.

When a plurality of output ports are obtained from the Tag table 2700 for an expansion tag, used as algorithm for determining an output port for a frame in question from among the plurality of output ports may be the method described in the first exemplary embodiment.

In a case of failure occurrence, upon receiving a notification from the failure management unit 770, when the number of ports obtained from ports stored in the output port of the Tag table 2700 is plural, the table search unit 2630 excludes a port developing a fault from the obtained ports (from ports to be selected as an output port).

Used as algorithm for determining an output destination from a plurality of output ports after excluding a fault developing port is any of the methods described in the first exemplary embodiment.

After determining an output port, the table search unit 2630 notifies the frame transfer unit 820 of the determined output port information.

Figure 27:
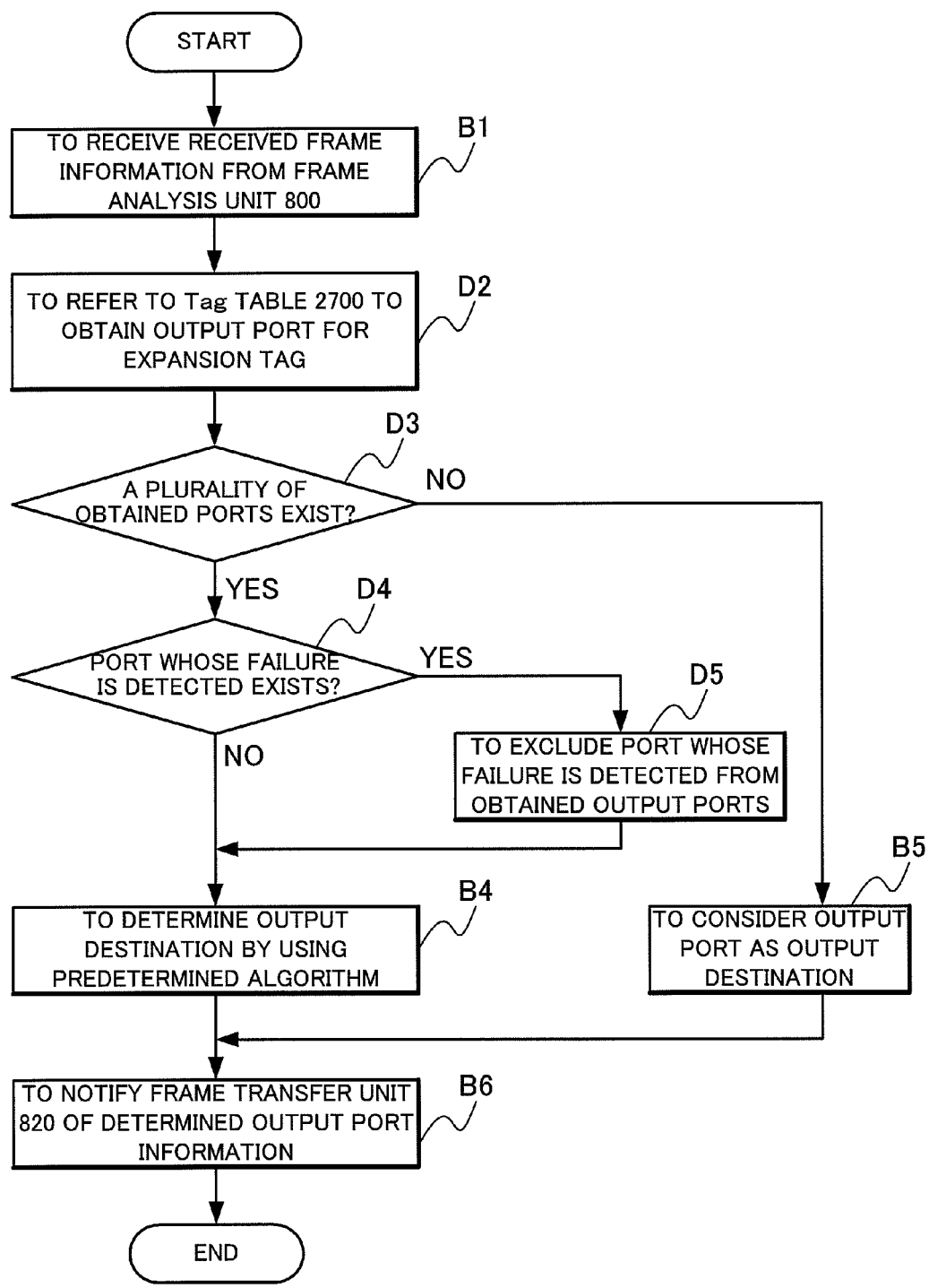
FIG. 27 is a flow chart of determining an output destination of a received frame at a table search unit 2630 of the present invention.

Flow chart of Tag table 2700 setting processing at the table control unit 2690 is shown in FIG. 26 and received frame output port determination processing at the table search unit 2630 is shown in FIG. 27 which are the characteristic processing of the present invention among the respective units described in the foregoing.

As shown in FIG. 26, upon receiving the STP port information from the STP control unit 880 at Step A1, the table control unit 2690 updates the Tag table 2700 based on the received STP port information at Step A2.

In addition, as shown in FIG. 27, upon receiving the received frame information from the frame analysis unit 800 at Step B1, the table search unit 2630 obtains an output port for an expansion tag with reference to the Tag table 2700 at Step B2.

Here, when determining whether there exists one output port obtained or exist a plurality of them at Step B3 to find that a plurality of them exist, further determine at Step D4 whether the obtained plurality of output ports include a port whose failure is detected by the failure management unit 770.

When a port whose failure is detected is included at Step D4, execute processing of excluding the port whose failure is detected from the obtained plurality of output ports at Step D5.

The output port whose failure is detected is deleted from the output port of the Tag table 2700 by the table control unit 2690.

Then, at Step B4, determine an output destination by using predetermined algorithm with output ports without the port whose failure is detected as a target. Thereafter, notify the frame transfer unit 820 of the determined output port information at Step B6.

When the number of ports obtained at Step B3 is one port, determine the obtained output port as an output destination at Step B5. Thereafter, notify the frame transfer unit 820 of the determined output port information at Step B6.

Frame transfer method of the present invention will be described with respect to frame transfer from the terminal T8 to the terminal T5 in the network shown in FIG. 1 formed of the edge switches E5 through E8 and the core switches C5 and C6 having the foregoing described structure as an example.

Use of the frame transfer method according to the present invention, similarly to the first exemplary embodiment, realizes shortest path transfer from the user terminal T8 to the user terminal T5 which is the characteristic of the related art, while use of a link yet to be used in the related art for the frame transfer improves band use efficiency of the network as a whole.

In the following, description will be made of table contents and a table setting procedure at the edge switch E8 and the core switch C6 having the Tag table 2700 in a case where there exits a port whose failure is detected, which is a big difference from the first exemplary embodiment.

Tables of the edge switch E8 are shown in the lump in FIG. 28.

At the edge switch E8, the STP control unit 880 has the STP port state management table 1404 shown in FIG. 28(A). When the port state of the STP becomes stable, the STP control unit 880 refers to the STP port state management table 1404 to notify the table control unit 2690 of VLAN=g5 and the port 1 which is a port whose port function is the Root port and whose port state is the Forwarding state and the VLAN=g5 and the port 2 which is a port whose port function is the Alternate port.

The table control unit 2690 sets as an output port for the expansion tag=g5, in the Tag table 2700 of the forwarding table storage unit 2640, the port p1 notified by the STP control unit 880 whose port function is the Root port and whose port state is the Forwarding state and the port p2 notified by the STP control unit 880 whose port function is the Alternate port.

The resultant Tag table 2700 will be a Tag table 2901 shown in FIG. 28(B). The other tables are registered as indicated in the MAC/Tag table 1502 (FIG. 28(C)) and the MAC table 1503 (FIG. 28(D)) shown in FIG. 12.

Subsequently, description will be made of a table of the core switch C6 as a node at a hop subsequent to the edge switch E8 on the transfer path with reference to FIG. 29.

At the core switch C6, the STP control unit 880 has such STP port state management table 1406 as shown in FIG. 29(A).

By the same processing as described above with respect to E8, the STP control unit 880 sets the Tag table 2700 based on the STP port state. More specifically, when the port state of the STP becomes stable, the STP control unit 880 refers to the STP port state management table 1406 to notify the table control unit 2690 of VLAN=g5 and the port 1 which is a port whose port function is the Root port and whose port state is the Forwarding state and the VLAN=g5 and the port 2 which is a port whose port function is the Alternate port.

The table control unit 2690 sets as an output port for the expansion tag=g5, in the Tag table 2700 of the forwarding table storage unit 2640, the port p1 notified by the STP control unit 880 whose port function is the Root port and whose port state is the Forwarding state and the port p2 notified by the STP control unit 880 whose port function is the Alternate port.

The resultant Tag table 2700 will be a Tag table 3001 shown in FIG. 29 (B), whose output port field has the ports p1 and p2 set.

Description will be made in the following with respect to frame transfer processing at each switch in a state where the foregoing described table setting is made with reference to the diagram of the node structure shown in FIG. 23 and the tables in FIGS. 28 and 29.

The edge switch E8 having received the Ethernet (registered trademark) frame 2100 directed to the terminal T5 from the terminal T8 shown in FIG. 18 analyzes at the frame analysis unit 800 that an input frame is an ordinary Ethernet (registered trademark) frame 200 to notify the table search unit 2630 of header information, frame kind information and input port information and notify the frame rewriting unit 810 of the entire frame or a payload part.

Since the received frame is the Ethernet (registered trademark) frame 200 and the input port is a user terminal side port, the table search unit 2630 refers to the MAC/Tag table 1502 to obtain the expansion tag g5 for the destination MAC address t5 and the VLAN=A and instruct the frame rewriting unit 810 to execute expansion tag stacking processing. Also with reference to the Tag table 2901, obtain the output port p1 and the output port p2 for the expansion tag g5. Thereafter, with the obtained ports p1 and p2 as a target, determine an output destination port and notify the frame transfer unit 820 of the same by a predetermined method.

Predetermined method may be algorithm such as round robin or weighting round robin as described above, or a method of selecting an output port by hashing by using header information of an Ethernet (registered trademark) frame including a destination MAC address and a transmission source MAC address or header information of an IP packet including a destination IP address and a transmission source IP address stored in a payload of an Ethernet (registered trademark) frame, or a combination of these pieces of information.

The frame rewriting unit 810 executes the processing of stacking the expansion tag g5 instructed by the table search unit 2630 with respect to a frame or a payload received from the frame analysis unit 800. As a result, a frame to be output will be the expansion tag frame 2200 shown in FIG. 19.

After rewriting the frame, the frame rewriting unit 810 transfers the expansion tag frame 2200 to the frame transfer unit 820.

The frame transfer unit 820 outputs the expansion tag frame 2200 to the output port p1 or p2 received from the table search unit 2630. In line with the frame transfer processing, learning processing is also executed similarly to the first exemplary embodiment when necessary.

Subsequently, description will be made of the core switch C6 at a subsequent hop connected to the side of the port p1 of the edge switch E8.

The core switch C6 having received the expansion tag frame 2200 from the edge switch E8 analyzes at the frame analysis unit 800 that the input frame is the expansion tag frame 300 to notify the table search unit 2630 of header information, frame kind information and input port information, as well as notifying the frame rewriting unit 810 of the entire frame or a payload part.

Since the received frame is the expansion tag frame 300, the input port is the network side port and the value of the expansion tag is a node ID of other node, the table search unit 2630 refers to the Tag table 3001 to obtain the output port p1 and the output port p2 for the expansion tag g5. Thereafter, with the obtained ports p1 and p2 as a target, determine an output destination port by a predetermined method. Thereafter, notify the frame rewriting unit 810 of no frame rewriting and notify the frame transfer unit 820 of the determined output port p1 or p2.

The frame rewriting unit 810 transfers the expansion tag frame 2200 received from the frame analysis unit 800 to the frame transfer unit 820 without executing rewriting processing.

The frame transfer unit 820 outputs the expansion tag frame 2200 to the output port p1 or p2 received from the table search unit 2630.

The edge switch E6 connected to the side of the port p1 of the core switch C6, the edge switch E5 at a hop subsequent to the edge switch E6, the edge switch E7 connected to the side of the port p2 of the edge switch E8 and the core switch C5 connected to the side of the port p2 of the core switch C6 execute the same processing as that described in the first exemplary embodiment to transfer a frame. As a result, the Ethernet frame (registered trademark) frame 2100 arrives at the user terminal T5 as a destination.

As described in the foregoing, the Ethernet (registered trademark) frame 2200 sent from the user terminal T8 to the user terminal T5 is allowed to arrive at the user terminal T5 as a destination by a shortest path through the edge switch E8, the core switch C6, the edge switch E6 and the edge switch E5 according to the related art, while it is also allowed to arrive at the user terminal T5 as a destination by using a path through the edge switch E8, the edge switch E7, the core switch C5 and the edge switch E5 or a path through the core switch C6, the core switch C5 and the edge switch E5 as a characteristic of the present invention.

This enables the link between the edge switch E8 and the edge switch E7 and the link between the core switch C6 and the core switch C5 which are not used in the related art to be used for frame transfer, thereby improving band use efficiency of the network as a whole.

Subsequently, description will be made of frame transfer to be executed when a failure occurs in the network. Description will be here made of a case where the link between the core switch C6 and the edge switch E6 develops a fault as shown in FIG. 20 as one example of a failure which is a change occurring in transfer to the link on the side of the Alternate port which is a characteristic of the present invention. With the structure of the present exemplary embodiment, while maintaining an equivalent effect to that of the first exemplary embodiment in terms of band use efficiency as compared with the related art, recovery from a failure can be sped up more than in the first exemplary embodiment.

In a case where the link between the core switch C6 and the edge switch E6 develops a fault in the network shown in FIG. 1, upon detection of a failure, the failure management unit 770 in the core switch C6 notifies the STP control unit 880 and the table search unit 2630 of the failure.

The STP control unit 880 starts tree re-structuring processing. Since the processing is conformed to standard operation of RSTP, no detailed description will be made thereof.

Upon receiving a failure notification from the failure management unit 770, the table search unit 2630 changes the output port determination method. Upon reception of the failure notification and thereafter, the table search unit 2630 excludes the output port whose failure is detected from the output ports obtained from the Tag table 2700 to obtain only port numbers of the remaining output ports. With reference to FIG. 29, while in a normal state, the ports p1 and p2 are obtained from the Tag table 3001 to determine an output destination by a predetermined method, upon the reception of a failure notification and thereafter, only the port p2 is obtained and considered as an output destination with the port p1 whose failure is detected excluded from the ports p1 and p2 obtained from the Tag table 3001.

In the core switch C6 having received the expansion tag frame 2200 from the edge switch E8 analyzes at the frame analysis unit 800 that the input frame is the expansion tag frame 300 to notify the table search unit 2630 of header information, frame kind information and input port information, as well as notifying the frame rewriting unit 810 of the entire frame or a payload part.

Since the received frame is the expansion tag frame 300, the input port is the network side port and the value of the expansion tag is a node ID of other node, the table search unit 2630 refers to the Tag table 3001 to obtain the output port p2 as an output port for the expansion tag g5. Thereafter, notify the frame rewriting unit 810 of no frame rewriting and notify the frame transfer unit 820 of the output port p2.

The frame rewriting unit 810 transfers the expansion tag frame 2200 received from the frame analysis unit 800 to the frame transfer unit 820 without executing rewriting processing.

The frame transfer unit 820 outputs the expansion tag frame 2200 to the output port p2 received from the table search unit 2630.

Unlike before a failure occurs, the core switch C6 outputs all the frames received from the edge switch E8 to the port p2, so that the frames arrive at the user terminal T5 as a destination through the core switch C5 and the edge switch E5.

Also in the core switch C6, tree re-structuring processing as of after failure occurrence is executed in the STP control unit 880.

FIG. 30 shows a state of each table as of after a port state of the STP becomes stable.

Assume that after the port state of the STP becomes stable, the port state of the STP will be as illustrated in the STP port state management table 2400 in FIG. 30(A).

With reference to the STP port state management table 2400, the STP control unit 880 notifies the table control unit 2690 of the VLAN=g5 and the port 2 as a port whose port function is the Root port and whose port state is the Forwarding state. Since there exists no port whose port function is the Alternate port in the STP port state management table 2400, nothing is notified related thereto.

The table control unit 2690 sets, in the Tag table 2700 of the forwarding table storage unit 2640, the port p2 notified from the STP control unit 880 as an output for the expansion tag g5. The resultant Tag table 2700 is as shown in a Tag table 3101 shown in FIG. 30(B).

At the time of updating the Tag table 2700, the table control unit 2690 also notifies the table search unit 2630 of update of the Tag table 3101.

The table search unit 2630 returns the determination processing to the ordinary processing to determine an output port with reference to the output port of the Tag table 2700.

Since the port number stored in the output port here is the existing output port, an output destination remains the same as a result, so that the core switch C6 outputs all the frames received from the edge switch E8 to the port p2, which frames arrive at the destination user terminal T5 through the core switch C5 and the edge switch E5.

As described in the foregoing, the present exemplary embodiment enables recovery at the time of a failure to be sped up by, at a time of a failure, transferring a frame to a port to be an output destination in advance prior to update of a tree port state according to an RSTP procedure to determine the output destination.

While the above-described second exemplary embodiment is structured to, when there exist a plurality of output ports obtained with reference to the Tag table 2700, if the obtained plurality of output ports include a port whose failure is detected, execute processing of excluding the port whose failure is detected from among the obtained plurality of output ports to determine an output destination by using predetermined algorithm with the remaining output ports without the port whose failure is detected as a target, it may be structured to set a port number of a port whose port function is the Alternate port as an output port for failure occurrence in a field of an output port for failure occurrence provided as shown in a Tag table 2800 in FIG. 31.

In this case, in the ordinary state where no failure notification is made, an output port is obtained with the output port and the output port for failure occurrence in the Tag table 2800 as a target to determine an output destination by using predetermined algorithm, while upon reception of a failure notification, a port set at the output port for failure occurrence in the Tag table 2800 is taken as an output port. This enables recovery at the time of a failure to be sped up.

Effects of the Second Exemplary Embodiment

Thus described in the present exemplary embodiment, the Ethernet (registered trademark) frame 2200 sent from the user terminal T8 to the user terminal T5 is allowed to arrive at the user terminal T5 as a destination by a shortest path through the edge switch E8, the core switch C6, the edge switch E6 and the edge switch E5 according to the related art, while it is also allowed to arrive at the user terminal T5 as a destination by using a path through the edge switch E8, the edge switch E7, the core switch C5 and the edge switch E5 or a path through the core switch C6, the core switch C5 and the edge switch E5 as a characteristic of the present invention. Also when a failure occurs, prior to detection of the failure, switching to a port which will be a transfer destination in topology as of after the failure enables failure recovery to be sped up.

In short, the present exemplary embodiment enables frame transfer while distributing loads by using a link not used in the related art for frame transfer, as well as enabling shortest path transfer, thereby improving band use efficiency of the network as a whole and further speeding up recovery at the time of a failure.

Third Exemplary Embodiment

Third exemplary embodiment of the present invention will be detailed with reference to the drawings.

Figure 32:
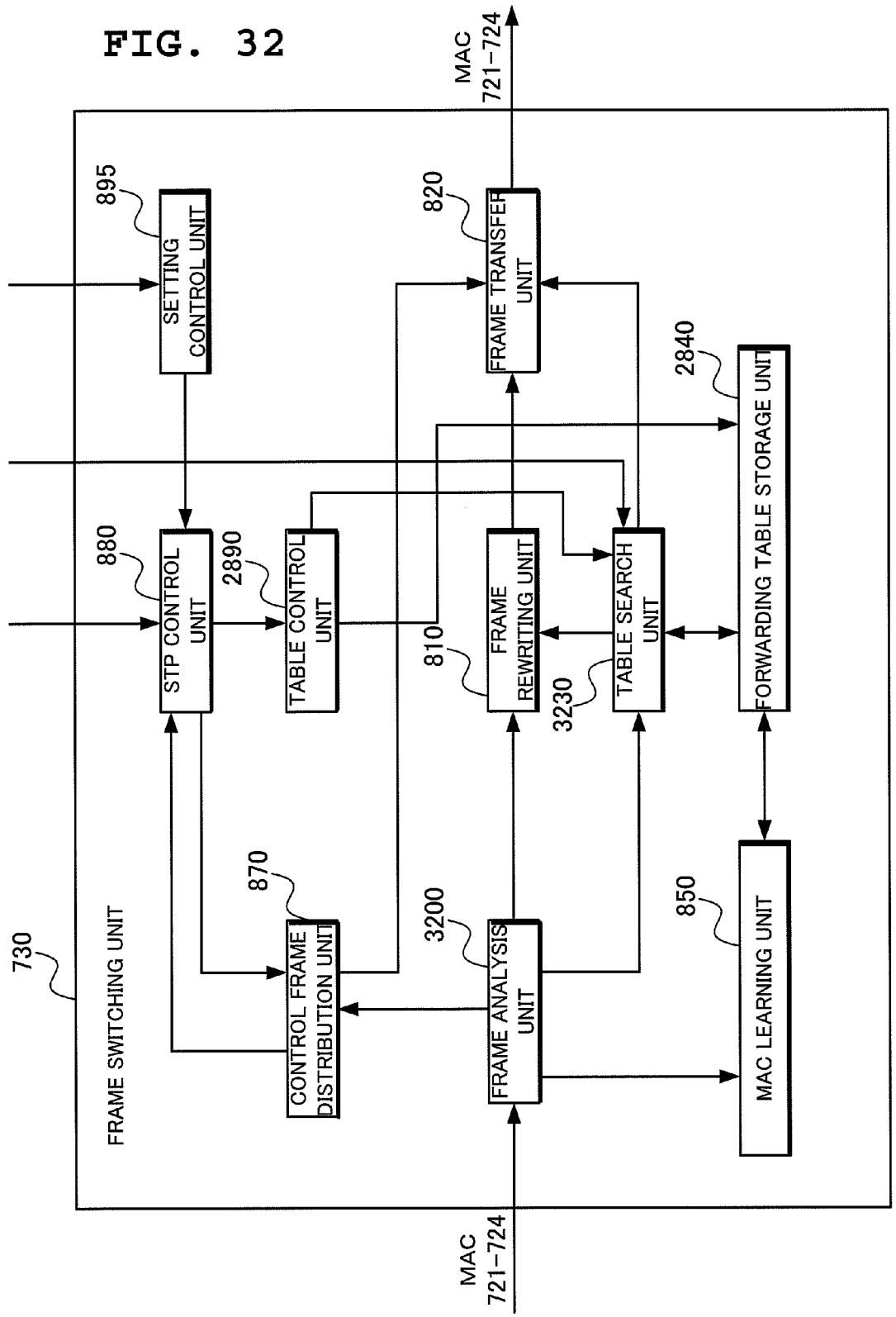
FIG. 32 is a diagram showing a structure of a frame switching unit according to a third exemplary embodiment of the present invention.

FIG. 32 shows a detailed structure of the frame switching unit 730 according to the third exemplary embodiment.

Shown in FIG. 32 is the frame switching unit 730 according to the second exemplary embodiment illustrated in FIG. 23, in which the table search unit 2630 is changed to a table search unit 3230 and the frame analysis unit 800 is changed to a frame analysis unit 3200. In addition, the forwarding table storage unit 2640 is changed to a forwarding table storage unit 2840 and accordingly the table control unit 2690 is changed to a table control unit 2890 and the table search unit 2630 is changed to the table search unit 3230.

First, the forwarding table storage unit 2840 will be described. The Tag table of the forwarding table storage unit 2840 is changed to the Tag table 2800 having fields of an output port and an output port for failure occurrence as shown in FIG. 31. Structure of the Tag table 2800 is as illustrated in FIG. 31, in which the Tag table 2800 manages an output port for an ordinary state and an output port for failure occurrence with respect to an expansion tag as shown in FIG. 31, while the Tag table 900 manages an output port for an expansion tag.

Subsequently, the table control unit 2890 will be described.

The table control unit 2890 sets an output port for an expansion tag based on port information of STP notified by the STP control unit 880 similarly to the table control unit 890.

Upon receiving port information corresponding to a tree ID from the STP control unit 880, that is, a port number of a port whose port function is the Root port and whose port state is the Forwarding state, or a port whose port function is the Alternate port, the table control unit 2890 recites, in an entry whose expansion tag field has equivalence to the received tree ID in the Tag table 2800 of the forwarding table storage unit 2840, a port number of a port whose port function is the Root port and whose port state is the Forwarding state as an output port and a port number of a port whose port function is the Alternate port as an output port for failure occurrence.

Subsequently, the frame analysis unit 3200 will be described.

In addition to the processing of the frame analysis units 800 according to the first and second exemplary embodiments, the frame analysis unit 3200 also notifies frame priority information as frame kind information to be notified to the table search unit 3230. The other processing is the same as that of the frame analysis unit 800.

Subsequently, the table search unit 3230 will be described.

The table search unit 3230 has a change in the processing of referring to the Tag table 900 to obtain an output port for an expansion tag executed by the table search unit 830. While the table search unit 830 obtains one or a plurality of ports stored in the output port field of the Tag table 900, the table search unit 2630 obtains both a port stored in the output port field and a port stored in the field of the output port for failure occurrence in the Tag table 2800. Since no relevant port might exist as the output port for failure occurrence, obtained port will be singular or plural.

The table search unit 3230 refers to the Tag table 2800 to obtain an output port and an output port for failure occurrence with respect to an expansion tag, while when there exists no output port for failure occurrence among the obtained ports, determining an output port from ports obtained from the output port field in the Tag table 2800 irrespective of frame priority. When a plurality of ports are obtained, any of the methods shown in the first exemplary embodiment can be used as algorithm for determining an output destination from a plurality of output ports.

When there exists an output port for failure occurrence among the obtained ports, an output port is determined from the obtained ordinary state output port and output port for failure occurrence taking frame priority into consideration.

After determining the output port, the table search unit 3230 notifies the frame transfer unit 820 of the determined output port information.

As described in the foregoing, since the Alternate port through which transfer is newly allowed according to the present invention is a port whose cost for a Root node is the lowest second to the Root port, a path reaching the Root node as a destination through a link on the Alternate port side is a path whose cost is equivalent to or the lowest second to the shortest path according to the related art. Therefore, when referring to the Tag table 2800 to obtain an output port and an output port for failure occurrence, the table search unit 3230 considers the output port as an output destination with respect to a frame whose priority is high and considers the output port for failure occurrence as an output destination with respect to a frame whose priority is low.

In general, frame priority is determined based on a priority bit of a VLAN tag. In some cases, priority may be set for a destination MAC address or a transmission source MAC address to make determination based on the same.

Executing such transfer processing enables a high-priority frame to be transferred by a shortest path to a destination and enables a low-priority frame to reach a destination through a path whose cost is as low as possible although it is not a shortest path.

When a failure occurs, upon receiving a notification from the failure management unit 770, the table search unit 3230 obtains a port number of a port stored in the output port for failure occurrence in the Tag table 2700 to determine an output destination.

After determining an output port, the table search unit 830 notifies the frame transfer unit 820 of the determined output port information.

Figure 33:
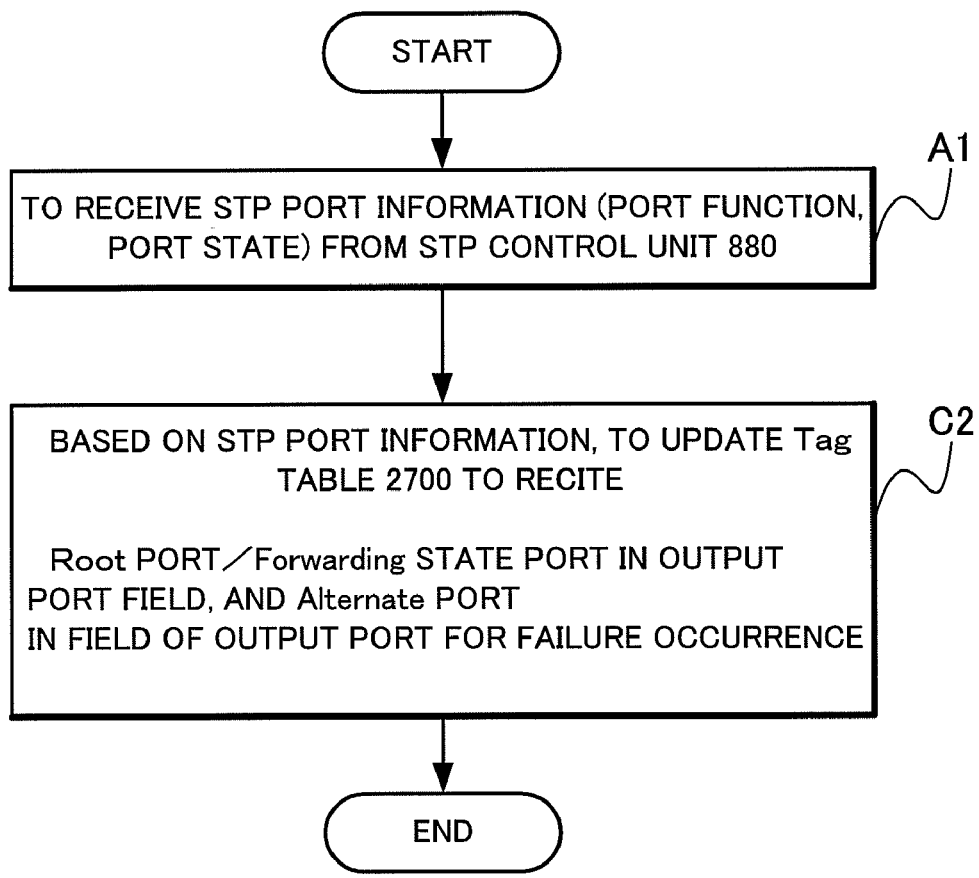
FIG. 33 is a flow chart of setting a Tag table 2800 at a table control unit 2890 of the present invention.
Figure 34:
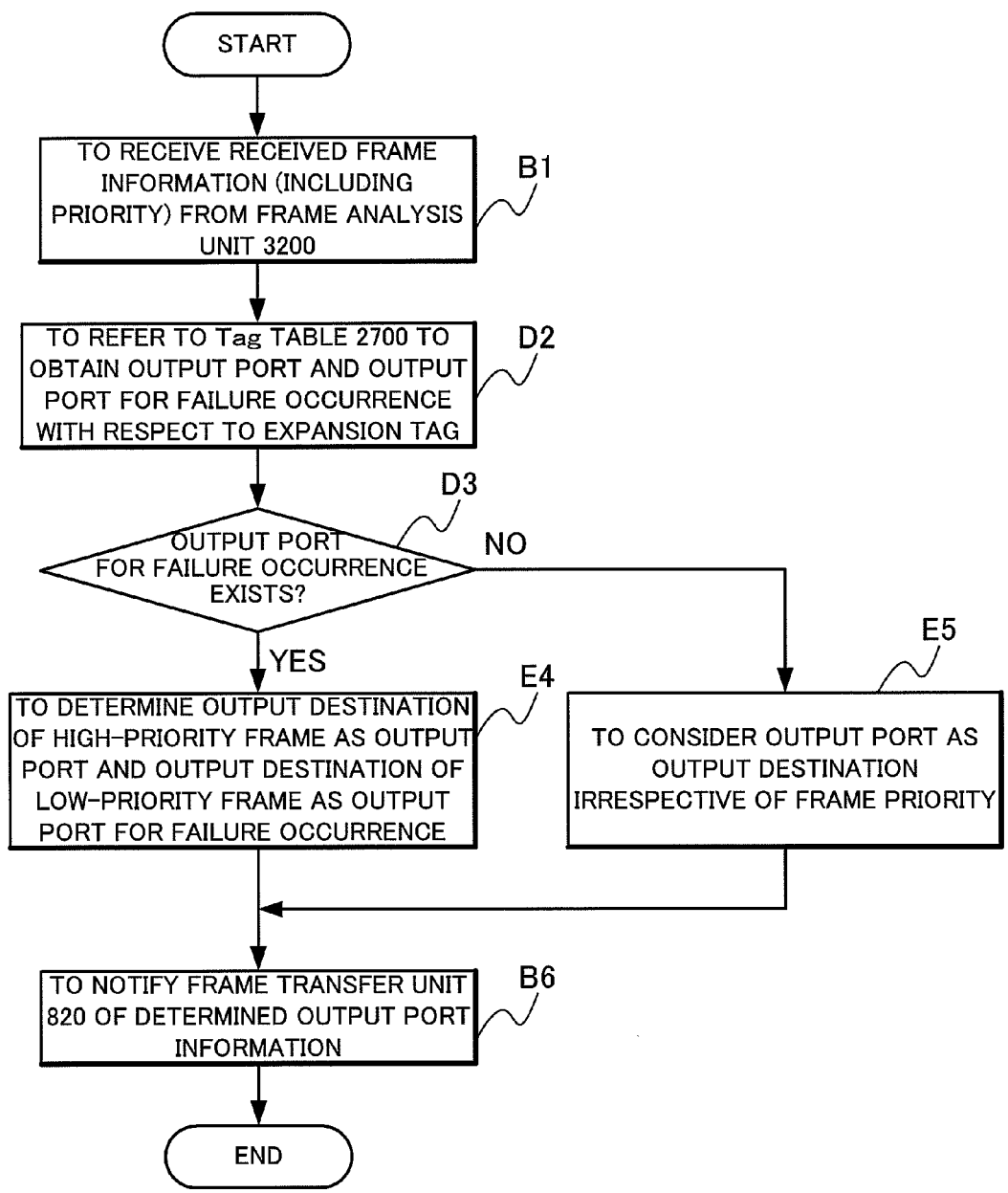
FIG. 34 is a flow chart of determining an output destination of a received frame at a table search unit 3230 of the present invention.

Received frame output port determination flow at the table search unit 3230 is shown in FIG. 34, which is the characteristic processing of the present invention among the foregoing descried respective units. Flow chart of setting processing of the Tag table 2800 by the table control unit 2890 is shown in FIG. 33.

As shown in FIG. 33, upon receiving STP port information from the STP control unit 880 at Step A1, the table control unit 2890 updates the Tag table 2800 based on the received STP port information at Step C2.

As shown in FIG. 34, upon receiving received frame information (including frame priority information) from the frame analysis unit 3200 at Step B1, the table search unit 3230 refers to the Tag table 2800 to obtain an output port and an output port for failure occurrence with respect to an expansion tag at Step D2.

Here, when determining whether there exists an output port for failure occurrence to find that it exists at Step D3, determine the obtained output port as an output destination of a high-priority frame and the output port for failure occurrence as an output destination of a low-priority frame at Step E4.

When there exists no output port for failure occurrence at Step D3, determine the obtained output port as an output destination irrespective of frame priority at Step E5.

Thereafter, notify the frame transfer unit 820 of the determined output port information at Step B6.

Figure 35:
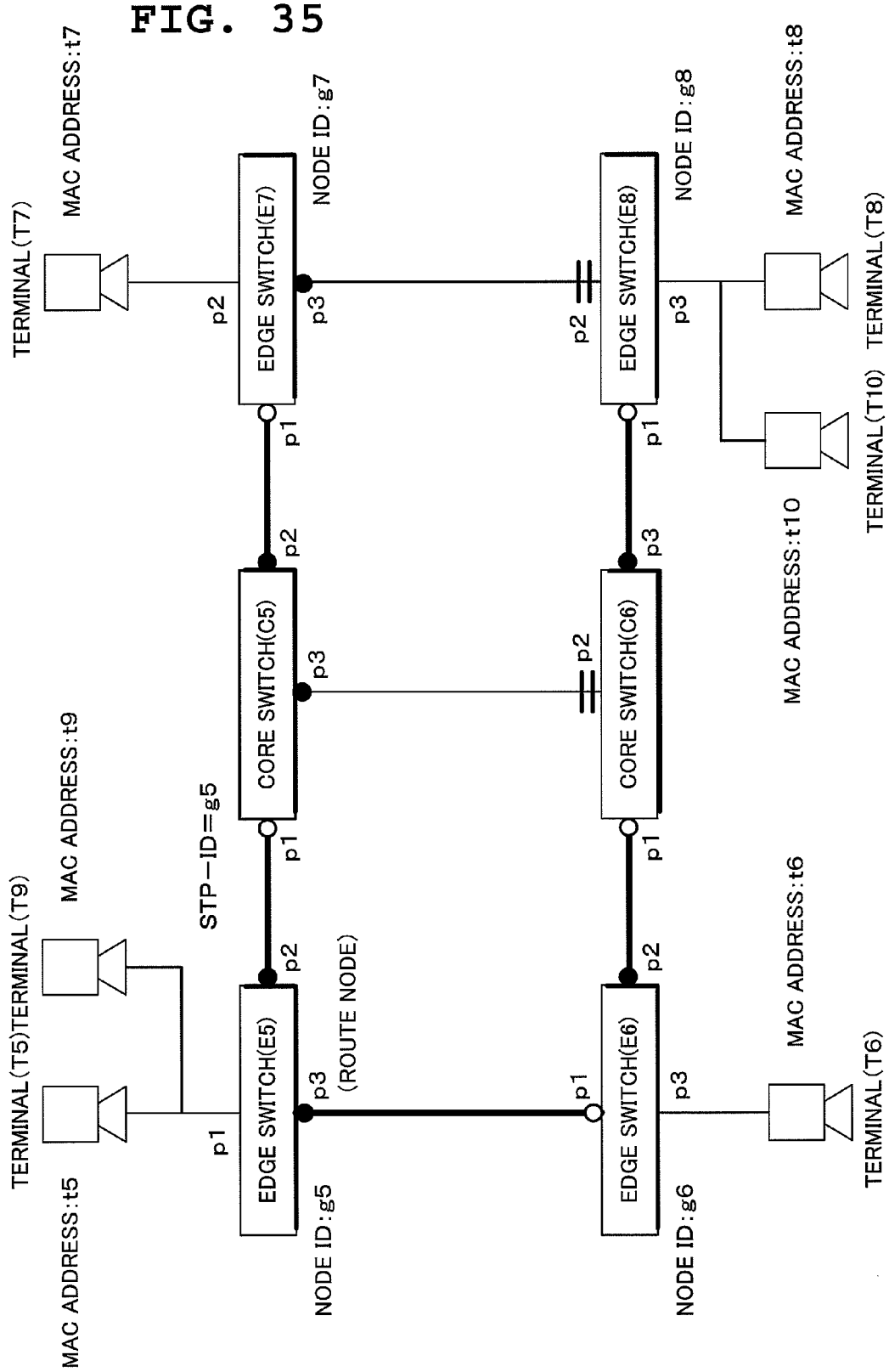
FIG. 35 is a diagram showing another network model of wide area Ether according to the present invention.

Description will be made of a frame transfer method according to the present invention in a case where in a network of the same topology as that of FIG. 1 formed of the edge switches E5 through E8 and the core switches C5 and C6 having the foregoing described structures, a terminal T10 is connected to the edge switch E8 together with the terminal T8 and a terminal T9 is connected to the edge switch E5 together with the terminal T5 to transfer a frame from the terminal T8 to the terminal T5 or from the terminal T10 to the terminal T9. FIG. 35 is a diagram of a network structure.

Use of the frame transfer method according to the present invention, similarly to the first and second exemplary embodiments, realizes shortest path transfer from the user terminal T8, T10 to the user terminal T5, T9 which is the characteristic of the related art, while improving band use efficiency of the network as a whole by the use of a link which is not used in the related art for frame transfer. In addition to the above-described characteristics, the present exemplary embodiment enables a high-priority frame to be transferred by a shortest path and a low-priority frame to be transferred by a path whose cost is as low as possible second to the shortest path according to priority of a frame to be transferred.

Description will be here made of table contents and a table setting procedure with respect to the edge switch E8 and the core switch C6 in which an output port for failure occurrence exists in the Tag table 2800 which is a big difference from the first exemplary embodiment.

Tables of the edge switch E8 are illustrated in the lump in FIG. 36.

In the edge switch E8, the STP control unit 880 has the STP port state management table 1404. The STP control unit 880, when a port state of the STP becomes stable, refers to the STP port state management table 1404 to notify the table control unit 2890 of the VLAN=g5 and the port 1 whose port function is the Root port and whose port state is the Forwarding state and the VLAN=g5 and the port 2 whose port function is the Alternate port.

The table control unit 2890 sets, in the Tag table 2800 of the forwarding table storage unit 2840, the port p1 whose port function is the Root port and whose port state is the Forwarding state which is notified from the STP control unit 880 as an output port for the expansion tag=g5 and the port p2 whose port function is the Alternate port which is notified from the STP control unit 880 as an output port for failure occurrence.

The resultant Tag table 2800 is as shown in a Tag table 2901 in FIG. 36. The other tables have the same registration as that of the MAC/Tag table 1502 and the MAC table 1503 in FIG. 12.

Subsequently, a table of the core switch C6 will be described which is a node at a hop subsequent to the edge switch E8 on the transfer path with reference to FIG. 37.

In the core switch C6, the STP control unit 880 has the STP port state management table 1406.

The STP control unit 880 sets the Tag table based on the STP port state by the same processing as that of E8 described above. More specifically, the STP control unit 880, when a port state of the STP becomes stable, refers to the STP port state management table 1406 to notify the table control unit 2890 of the VLAN=g5 and the port 1 whose port function is the Root port and whose port state is the Forwarding state and the VLAN g5 and the port 2 whose port function is the Alternate port.

The table control unit 2890 sets, in the Tag table 2800 of the forwarding table storage unit 2840, the port p1 whose port function is the Root port and whose port state is the Forwarding state which is notified from the STP control unit 880 as an output port for the expansion tag=g5 and the port p2 whose port function is the Alternate port notified from the STP control unit 880 as an output port for failure occurrence.

The resultant Tag table 2700 will be as shown in the Tag table 3001 in FIG. 37.

In the following, description will be made of a frame transfer processing procedure with respect to the edge switch E8 and the core switch C6 in which the Tag table 2800 has an output port for failure occurrence which is the characteristic of the present invention, with reference to the diagram of a node structure shown in FIG. 32 and the tables shown in FIG. 36 and FIG. 37.

Assume that from the user terminal T8 to the user terminal T5, the Ethernet (registered trademark) frame 2100 shown in FIG. 18 is transferred and that from the user terminal T10 to the user terminal T9, an Ethernet (registered trademark) frame 3400 shown in FIG. 39 is transferred.

Assume here that as to frame priority, the Ethernet (registered trademark) frame 2100 is a high-priority frame and the Ethernet (registered trademark) frame 3400 is a low-priority frame. The priority is recited in a priority bit in the VLAN tag A of the Ethernet (registered trademark) frames 2100 and 3400 as shown in the VLAN tag format of FIG. 40.

While the present exemplary embodiment is premised on that priority information is stored in the VLAN tag of the Ethernet (registered trademark) frames 2100 and 3400, the priority information may be stored in an expansion tag or in some cases where a tag for identifying a customer is inserted between an expansion tag and a VLAN tag although not described in the present specification, the priority information may be stored in the tag for identifying a customer. In any case, frame transfer is executed based on frame priority in the present invention as described in the following.

The edge switch E8 having received the Ethernet (registered trademark) frame 2100 directed to the terminal T5 from the terminal T8 analyzes at the frame analysis unit 3200 that the input frame is an ordinary Ethernet (registered trademark) frame 200 to find it a high-priority frame and notifies the table search unit 3230 of header information, frame kind information, input port information and priority information and notifies the frame rewriting unit 810 of the entire frame or a payload part.

Since the received frame is the Ethernet (registered trademark) frame 200 and the input port is a port on the side of the user terminal, the table search unit 3230 refers to the MAC/Tag table 1502 to obtain the expansion tag=g5 for the destination MAC address t5 and the VLAN=A and instructs the frame rewriting unit 1020 to execute expansion tag stacking processing. Also because the received frame is a high-priority frame, refer to the Tag table 2901 to obtain the output port p1 for the expansion tag g5 and notify the frame transfer unit 820 of the same.

The frame rewriting unit 810 executes the stacking processing of the expansion tag g5 instructed by the table search unit 3230 with respect to the frame or payload received from the frame analysis unit 3200. As a result, a frame to be output will be the expansion tag frame 2200 shown in FIG. 19.

After rewriting the frame, the frame rewriting unit 810 transfers the expansion tag frame 2200 to the frame transfer unit 820.

The frame transfer unit 820 outputs the expansion tag frame 2200 to the output port p1 received from the table search unit 3230.

When the received frame is the Ethernet (registered trademark) frame 3400 directed to the terminal T9 from the terminal T10, the edge switch E8 analyzes at the frame analysis unit 3200 that the input frame is an ordinary Ethernet (registered trademark) frame 200 to find it a low-priority frame and notifies the table search unit 3230 of header information, frame kind information, input port information and priority information and notifies the frame rewriting unit 810 of the entire frame or the payload part.

Since the received frame is the Ethernet (registered trademark) frame 200 and the input port is a port on the side of the user terminal, the table search unit 3230 refers to the MAC/Tag table 1502 to obtain the expansion tag=g5 for the destination MAC address t5 and the VLAN=A and instructs the frame rewriting unit 1020 to execute expansion tag stacking processing. Also because the received frame is a low-priority frame, refer to the Tag table 2901 to obtain the output port p2 for failure occurrence with respect to the expansion tag g5 and notify the frame transfer unit 820 of the same.

The frame rewriting unit 810 executes the stacking processing of the expansion tag g5 instructed by the table search unit 3230 with respect to the frame or payload received from the frame analysis unit 3200. As a result, a frame to be output will be an expansion tag frame 3600 shown in FIG. 41.

After rewriting the frame, the frame rewriting unit 810 transfers the expansion tag frame 3600 to the frame transfer unit 820. The frame transfer unit 820 outputs the expansion tag frame 3600 to the output port p2 received from the table search unit 3230.

Subsequently, description will be made of the core switch C6 at a subsequent hop connected to the side of the port p1 of the edge switch E8.

The core switch C6 having received the expansion tag frame 2200 from the edge switch E8 analyzes at the frame analysis unit 3200 that the input frame is the expansion tag frame 300 to notify the table search unit 3230 of header information, frame kind information, input port information and priority information and notify the frame rewriting unit 810 of the entire frame or a payload part. Input information of the input frame here indicates a high-priority frame.

Since the received frame is the expansion tag frame 300, the input port is a port on the side of the network, the value of the expansion tag is a node ID of other node and the frame is a high-priority frame, the table search unit 3230 refers to the Tag table 3001 to obtain the output port p1 for the expansion tag=g5. Thereafter, notify the frame rewriting unit 810 of no frame rewriting and notify the frame transfer unit 820 of the determined output port p1.

The frame rewriting unit 810 transfers the expansion tag frame 2200 received from the frame analysis unit 3200 to the frame transfer unit 820 without executing rewriting processing.

The frame transfer unit 820 outputs the expansion tag frame 2200 to the output port p1 received from the table search unit 3230.

The edge switch E6 connected to the side of the port p1 of the core switch C6, the edge switch E5 at a hop subsequent to the edge switch E6, the edge switch E7 connected to the side of the port p2 of the edge switch E8 and the core switch C5 connected to the side of the port p2 of the core switch C6 execute the same processing as that described in the first and second exemplary embodiments to transfer the frame (although an output port for failure occurrence is newly introduced into the Tag table 2700 in each case, because each switch fails to hold an Alternate port in the present network structure, substantial processing is the same). As a result, the Ethernet (registered trademark) frame 2100 arrives at the user terminal T5 as a destination.

As described in the foregoing, because the Ethernet (registered trademark) frame 2100 sent from the user terminal T8 to the user terminal T5 is a high-priority frame, the frame is allowed to arrive at the user terminal T5 as a destination through the shortest path to the edge switch E5 to which the user terminal T5 as the destination connects, that is, the path through the edge switch E8, the core switch C6, the edge switch E6 and the edge switch E5.

In addition, since the Ethernet (registered trademark) frame 3400 sent from the user terminal T10 to the user terminal T9 is a low-priority frame, the frame is allowed to arrive, toward the edge switch E5 to which the user terminal T9 as a destination connects, at the user terminal T9 as a destination through a second lowest cost transfer path through the edge switch E8, the edge switch E7, the core switch C5 and the edge switch E5 by using the link between the edge switch E8 and the edge switch E7 which is yet to be used in the related art.

Thus, according to the transfer method of the present exemplary embodiment, a high-priority frame is transferred through a lowest cost path and a low-priority frame is transferred through a path whose cost is as low as possible by using a link yet to be used in the related art. This enables band use efficiency of the network as a whole to be improved, while enabling transfer based on data priority.

Subsequently, description will be made of frame transfer to be executed when a failure occurs in the network. Description will be here made of a case where a link between the core switch C6 and the edge switch E6 develops a fault as shown in FIG. 20 as one example of a failure which is a change occurring in transfer to a link on the Alternate port side, which is the characteristic of the present invention.

In the ordinary state, the table search unit 3230 considers the output port in the Tag table 2800 as an output destination for a high-priority frame and considers the output port for failure occurrence as an output destination for a low-priority frame according to frame priority. On the other hand, after a failure occurs, upon receiving a failure notification from the failure management unit 770, the table search unit 3230 obtains only a port number of the output port for failure occurrence in the Tag table 2800 to consider the output port for failure occurrence as an output destination for both a high-priority frame and a low-priority frame.

In the core switch C6, the STP control unit 880 executes the tree re-structuring processing as of after failure occurrence. This tree re-structuring processing is the same as that of the second exemplary embodiment and FIG. 38 shows respective tables as of after the port state of the STP becomes stable after tree re-structuring.

With this arrangement, the present exemplary embodiment enables failure recovery to be sped up when a failure occurs by transferring a frame in advance to a port to be an output destination prior to update of the port state of the tree according to an RSTP procedure to determine the output destination.

Effects of the Third Exemplary Embodiment

As described in the foregoing with respect to the present exemplary embodiment, when priority is taken into consideration for a frame to be transferred, a high-priority frame is allowed to arrive at a destination user terminal through a lowest cost path and a low-priority frame is transferred to the destination user terminal through a path whose cost is as low as possible by using a link yet to be used in the related art. This enables band use efficiency in the network as a whole to be improved, while enabling transfer based on priority of data. Also when a failure occurs, failure recovery can be sped up by switching in advance after detection of the failure to a port which will be a transfer destination in topology as of after the failure.

In short, the present exemplary embodiment enables shortest path transfer, as well as enabling frame transfer by using a link yet to be used in the related art while distributing loads taking frame priority into consideration, and enables band use efficiency of the network as a whole to be improved, thereby speeding up recovery from a failure.

Fourth Exemplary Embodiment

Fourth exemplary embodiment of the present invention will be detailed with reference to the drawings.

Figure 42:
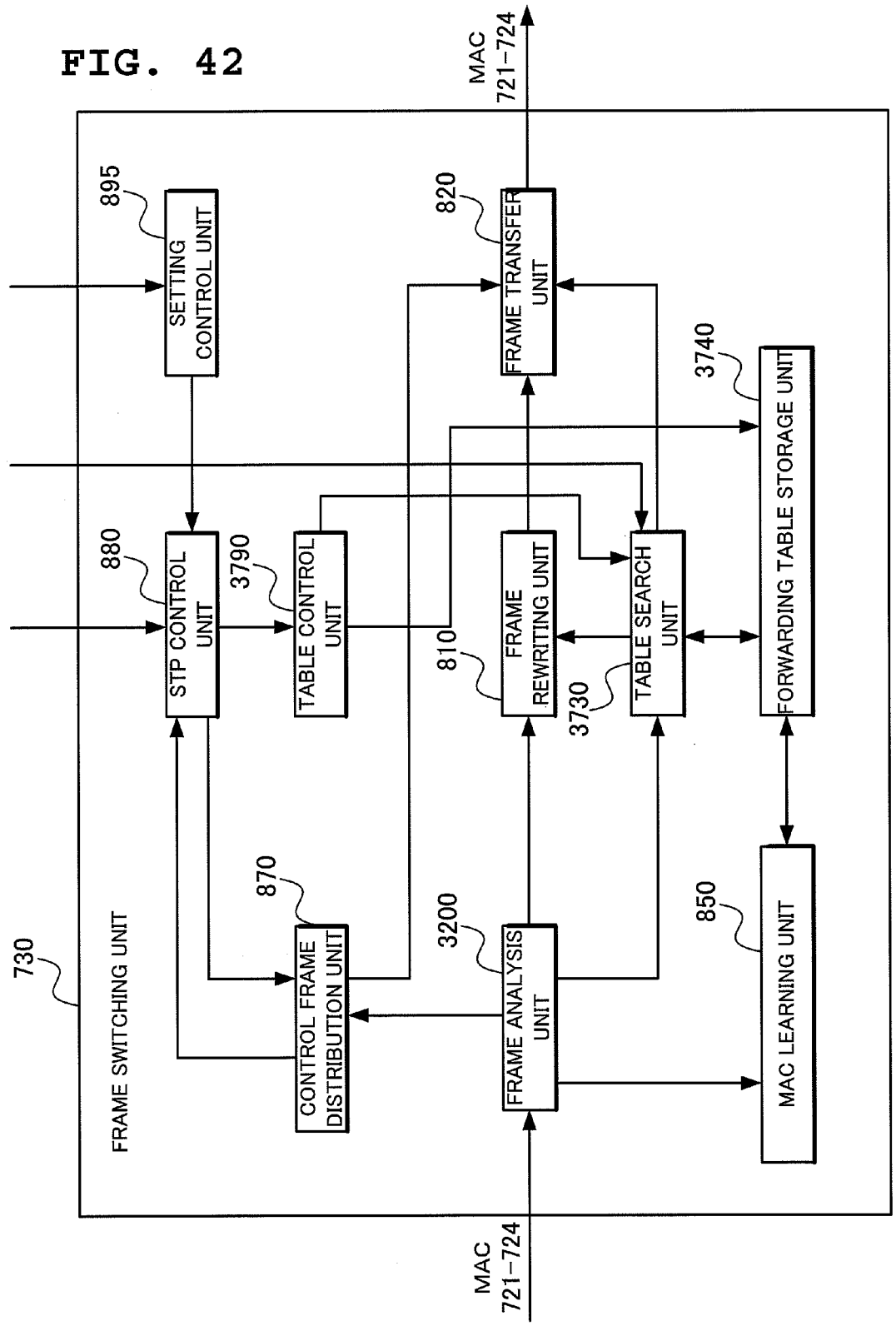
FIG. 42 is a diagram showing a structure of a frame switching unit according to a fourth exemplary embodiment of the present invention.

FIG. 42 shows a detailed structure of the frame switching unit 730 according to the fourth exemplary embodiment.

Shown in FIG. 42 is the frame switching unit 730 according to the third exemplary embodiment shown in FIG. 32, in which the table search unit 3230 is changed to a table search unit 3730, the forwarding table storage unit 2840 is changed to a forwarding table storage unit 3740 and the table control unit 2690 is changed to a table control unit 3790. In the following, difference from the third exemplary embodiment will be mainly described.

First, the forwarding table storage unit 3740 will be described.

Figure 43:
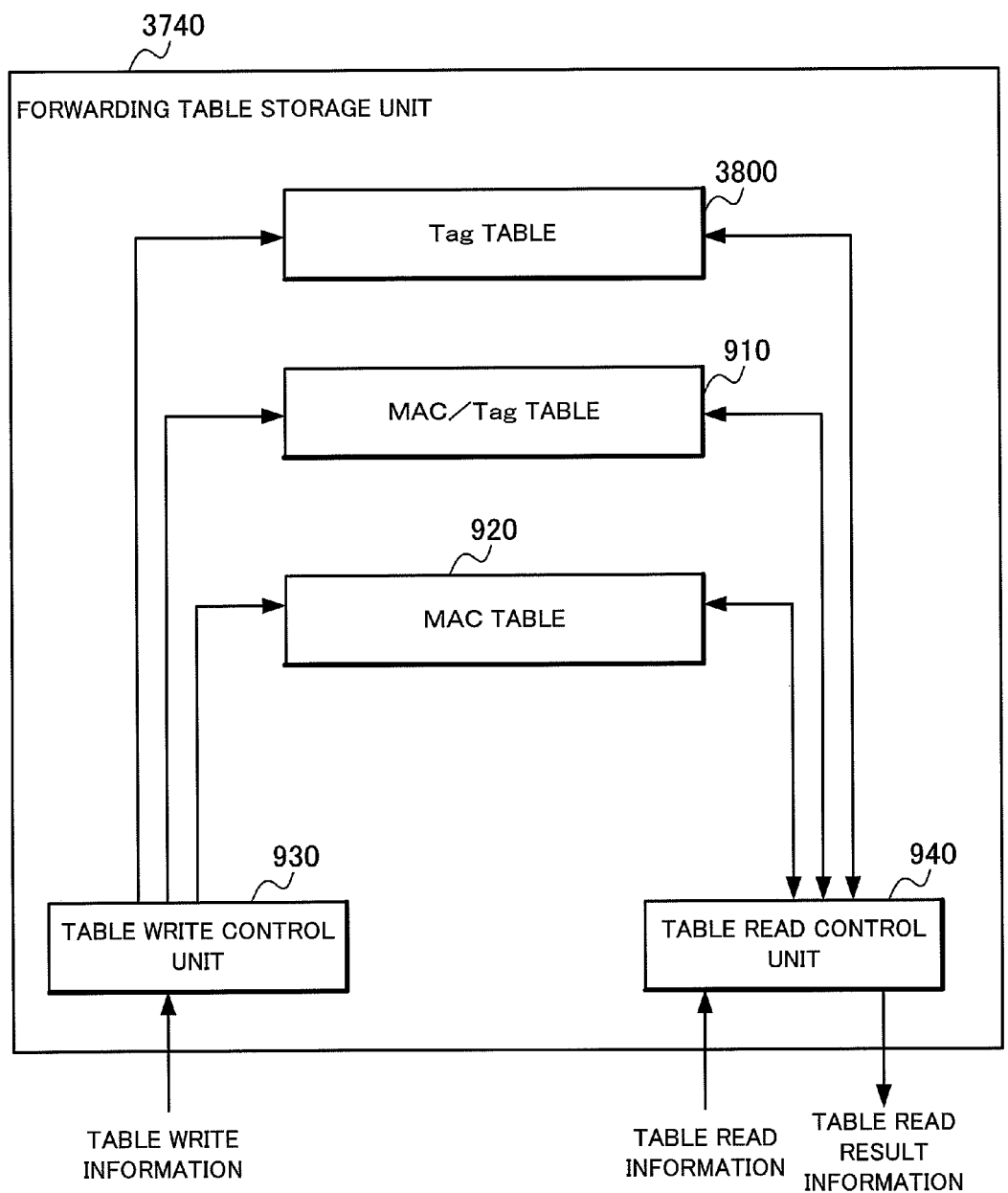
FIG. 43 is a diagram showing another structure of a forwarding table storage unit according to the present invention.

FIG. 43 shows an example of a structure of the forwarding table storage unit 3740.

In the forwarding table storage unit 3740, as compared with the forwarding table storage unit 2840 of the third exemplary embodiment, the Tag table 2800 shown in FIG. 31 is changed to a Tag table 3800.

Structure of the Tag table 3800 is as shown in FIG. 44. While the Tag table 2700 manages an output port and an output port for failure occurrence with respect to an expansion tag, the Tag table 3800 shown in FIG. 44 manages an output port, an output port for failure occurrence and a route path cost of each port. Route path cost is a parameter of STP/RSTP, which represents a cost for a route node.

Subsequently, the table control unit 3790 will be described.

In addition to setting of an output port for an expansion tag based on port information of STP notified from the STP control unit 880 similarly to the table control unit 2690, the table control unit 3790 sets a route path cost of each port.

As port information from the STP control unit 880, the table control unit 3790 obtains a route path cost together with a port function and a port state. Then, in the Tag table 3800 in the forwarding table storage unit 3740, recited are an output port, an output port for failure occurrence and their route path costs together.

Subsequently, the table search unit 3730 will be described. The table search unit 3230 determines an output port taking priority of a frame into consideration. The table search unit 3730 determines an output destination taking a route path cost of each port into consideration at the time of similarly determining an output port while taking frame priority into consideration.

When the output port and the output port for failure occurrence are obtained with reference to the Tag table 2700, the table search unit 3230 considers the output port as an output destination for a frame having high priority and considers the output port for failure occurrence as an output destination for a frame having low priority.

As the output port for failure occurrence=Alternate port, a path whose cost for a route node (route path cost) is the lowest second to the output port=Root port is selected.

In some of network structures, when route path costs of both ports are equal, Root or Alternate is determined by such a parameter as a port number.

This is because when route path costs are equal, even if the output port for failure occurrence=Alternate port is selected, arrival at a destination by a shortest path is enabled similarly to a case where the output port=Root port is selected.

Accordingly, when an output port and an output port for failure occurrence are obtained for an expansion tag with reference to the Tag table 3800, if route path costs of both the ports are equal, the table search unit 3730 determines an output destination by using the above-described predetermined method with both the ports as a target irrespective of priority of a frame and if the route path cost of the output port=Root port is smaller than the route path cost of the output port for failure occurrence=Alternate port, outputs a high-priority frame to the output port and a low-priority frame to the output port for failure occurrence.

Processing executed when a failure occurs is the same as that of the table search units 2630 and 3230. Upon receiving a notification from the failure management unit 770, the table search unit 3730 obtains a port number of a port stored in the output port for failure occurrence in the Tag table 3800 to determine an output destination.

After determining the output port, the table search unit 3730 notifies the frame transfer unit 820 of the determined output port information.

Figure 45:
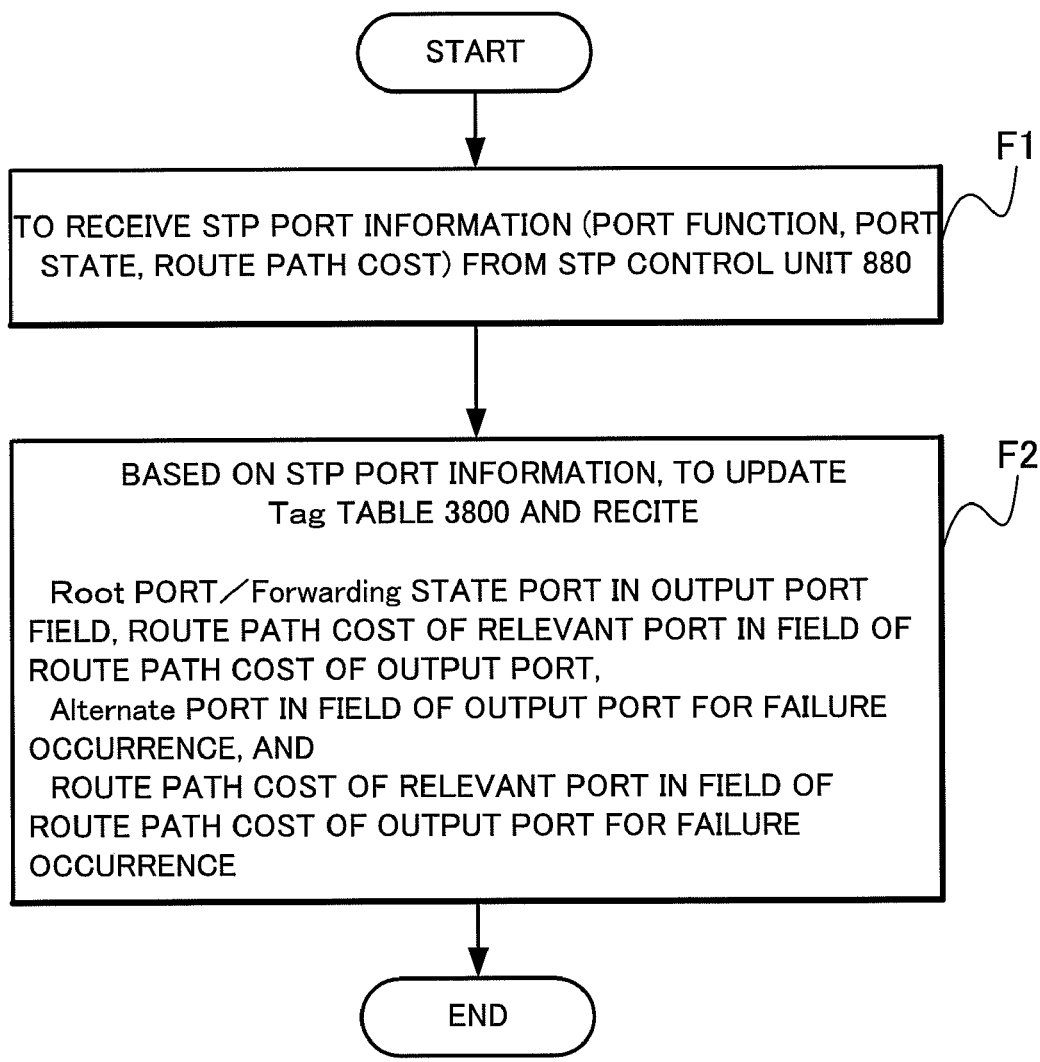
FIG. 45 is a flow chart of setting a Tag table 3800 at a table control unit 3790 of the present invention.
Figure 46:
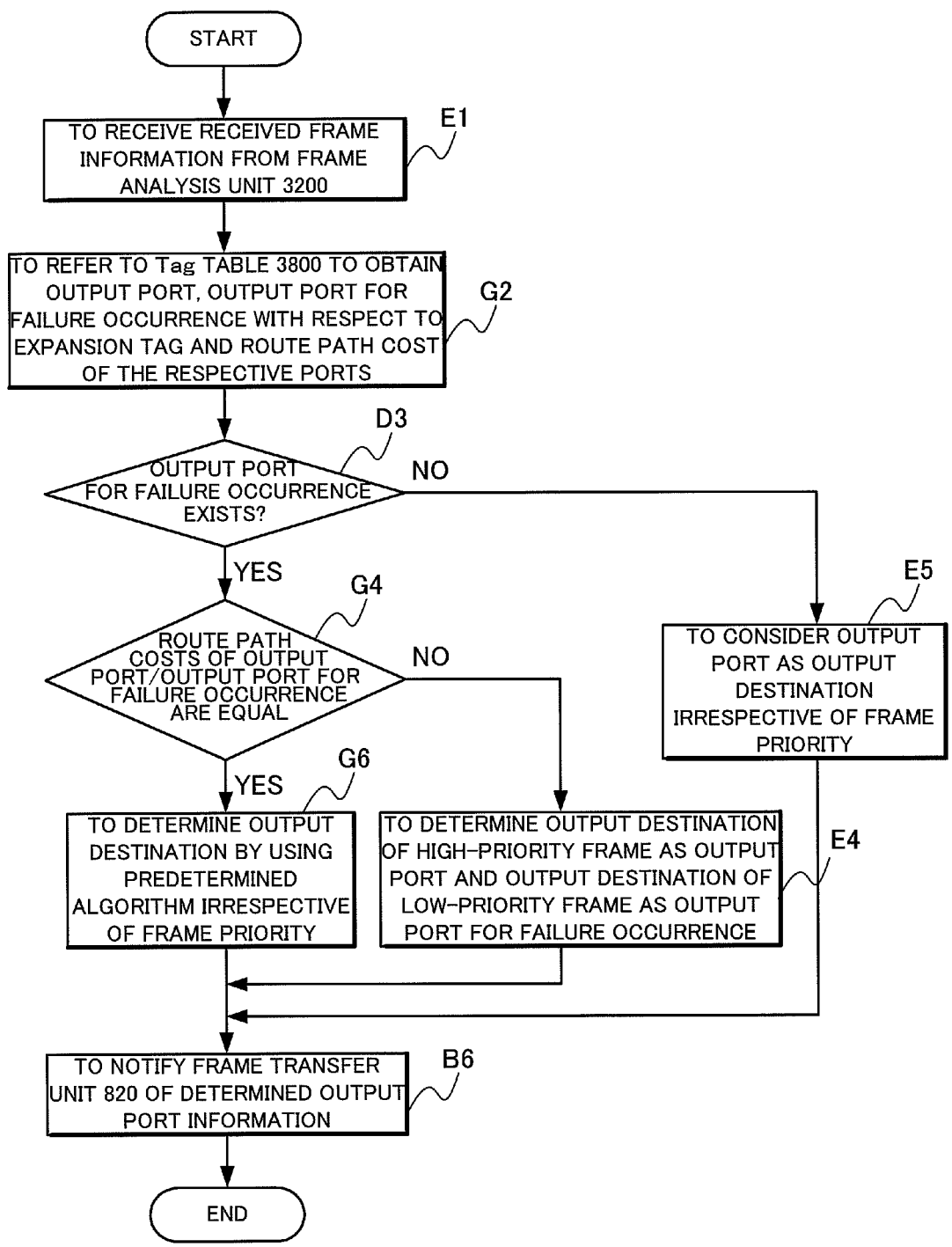
FIG. 46 is a flow chart of determining an output destination of a received frame at a table search unit 3730 of the present invention.
Figure 49:
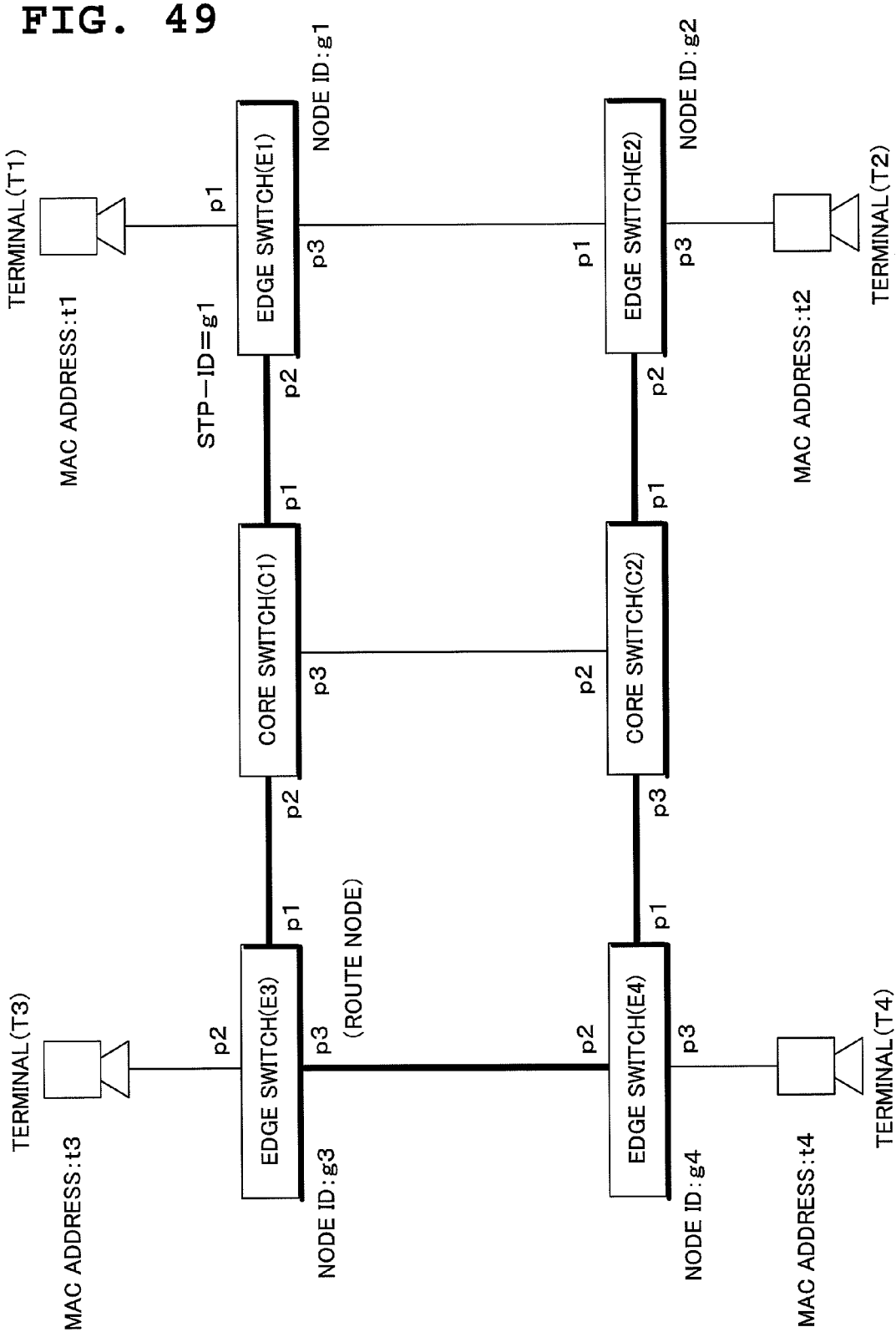
FIG. 49 is a diagram of a network model of wide area Ether according to related art.

Flow of setting the Tag table 3800 in the table control unit 3790 is shown in FIG. 45 and a received frame output port determination flow executed at the table search unit 3730 is shown in FIG. 46, which are characteristic processing of the present invention among the foregoing described respective units.

As shown in FIG. 45, upon receiving STP port information (including route path cost information) from the STP control unit 880 at Step F1, the table control unit 3790 updates the Tag table 3800 based on the received STP port information at Step F2.

Also as shown in FIG. 46, upon receiving received frame information (including frame priority information) from the frame analysis unit 3200 at Step E1, the table search unit 3730 refers to the Tag table 3800 at Step G2 to obtain an output port, an output port for failure occurrence and a route path cost of each port for the expansion tag.

Here, when determination whether there exists an output port for failure occurrence is made to find that it exists at Step D3, compare the route path costs of the obtained output port and output port for failure occurrence at Step G4 and when they are equal, determine an output destination with both ports as a target irrespective of frame priority by using predetermined algorithm at Step G6.

When the costs are not equal at Step G4, determine the obtained output port as an output destination of a high-priority frame and the output port for failure occurrence as an output destination of a low-priority frame at Step E4.

When there exists no output port for failure occurrence at Step D3, determine the obtained output port as an output destination irrespective of frame priority at Step E5. Thereafter, notify the frame transfer unit 820 of the determined output port information at Step B6.

Description will be made of a frame transfer method of the present invention to be executed when in the network formed of the edge switches E5 through E8 and the core switches C5 and C6 having the foregoing described structure shown in FIG. 35, a frame is transferred from the terminal T8 to the terminal T5 or from the terminal T10 to the terminal T9 similarly to the third exemplary embodiment. In the present exemplary embodiment, assume that only the link between the core switch C5 and the core switch C6 has a 100 Mbps band and the other links have a 1 Gbps band. In the present exemplary embodiment, therefore, assume that as a cost of each link, that of the 100 Mbps link is 10 and that of the other 1 Gbps links is 1.

Similarly to the first to third exemplary embodiments, use of the frame transfer method according to the present invention realizes shortest path transfer from the user terminal T8, T10 to the user terminal T5, T9 which is the characteristic of the related art, while improving band use efficiency of the network as a whole by the use of a link yet to be used in the related art for frame transfer.

Moreover, in addition to the above-described characteristics, the present exemplary embodiment enables a high-priority frame to be transferred through a shortest path and a low-priority frame through a path whose cost is as low as possible second to the shortest path according to priority of a frame to be transferred, and furthermore, when costs of candidate paths are equal, distributing without taking priority into consideration and when the costs are different, executing transfer according to priority enables a high-priority frame to be transferred by a shortest path while reducing unbalance due to priority as much as possible.

In the following, description will be made of a frame transfer processing procedure with respect to the edge switch E8 and the core switch C6 having the output port for failure occurrence existing in the Tag table 3800 which is the characteristic of the present invention. Tables of the edge switch E8 are shown in FIG. 47 (A) through (D) and tables of the core switch C6 are shown in FIGS. 48 (A) and (B).

Similarly to the third exemplary embodiment, assume that from the user terminal T8 to the user terminal T5, the Ethernet (registered trademark) frame 2100 shown in FIG. 18 is transferred and from the user terminal T10 to the user terminal T9, an Ethernet (registered trademark) frame 3400 in FIG. 39 is transferred and as to frame priority, the Ethernet (registered trademark) frame 2100 is a high-priority frame and the Ethernet (registered trademark) frame 3400 is a low-priority frame.

The edge switch E8 having received the Ethernet (registered trademark) frame 2100 directed to the terminal T5 from the terminal T8 analyzes at the frame analysis unit 3200 that the input frame is an ordinary Ethernet (registered trademark) frame 200 to find it a high-priority frame and notifies the table search unit 3730 of header information, frame kind information, input port information and priority information and notifies the frame rewriting unit 810 of the entire frame or a payload part.

Since the received frame is the Ethernet (registered trademark) frame 200 and the input port is a port on the side of the user terminal, the table search unit 3730 refers to the MAC/Tag table 1502 to obtain the expansion tag=g5 for the destination MAC address t5 and the VLAN=A and instructs the frame rewriting unit 1020 to execute expansion tag stacking processing. Also with reference to a Tag table 4001, find that the output port for the expansion tag=g5 is the port p1 and the route path cost is 3 and that the output port for failure occurrence is the port p2 and the route path cost is 3.

Although the received frame is a high-priority frame, because the route path costs of both the ports are equal, determine an output destination by using a predetermined method with both ports as an output destination target and notify the frame transfer unit 820 of the determined output port.

With respect to the frame or payload received from the frame analysis unit 3200, the frame rewriting unit 810 executes stacking processing of the expansion tag=g5 instructed from the table search unit 3730. As a result, a frame to be output will be the expansion tag frame 2200 shown in FIG. 19.

After frame rewriting, the frame rewriting unit 810 transfers the expansion tag frame 2200 to the frame transfer unit 820.

The frame transfer unit 820 outputs the expansion tag frame 2200 to the port p1 or the port 2 as an output port received from the table search unit 3230.

When the received frame is the Ethernet (registered trademark) frame 3400 directed to the terminal T9 from the terminal T10, because of the same output ports and the same route path costs for the expansion tag g5, the edge switch E8 determines an output destination by using a predetermined method with both the ports as an output destination target without taking frame priority into consideration and outputs the same. Frame to be output is the expansion tag frame 3600. Since details are the same as those described above of the Ethernet (registered trademark) frame 2100 directed to the terminal T5 from the terminal T8, no description will be made thereof.

Subsequently, description will be made of the core switch C6 at a subsequent hop connected to the side of the port p1 of the edge switch E8.

The core switch C6 having received the expansion tag frame 2200 from the edge switch E8 analyzes at the frame analysis unit 3200 that the input frame is the expansion tag frame 300 to notify the table search unit 3730 of header information, frame kind information, input port information and priority information and notify the frame rewriting unit 810 of the entire frame or a payload part. Here, the input information of the input frame indicates a high-priority frame.

The table search unit 3730 refers to the Tag table 4001 to find that the output port for the expansion tag=g5 is the port p1 and the route path cost is 2 and that the output port for failure occurrence is the port p2 and the route path cost is 11.

Since the received frame is a high-priority frame and route path costs of the two ports are not equal, determine the output port p1 as an output destination. Thereafter, notify the frame rewriting unit 810 of no frame rewriting and notify the frame transfer unit 820 of the determined output port p1.

The frame rewriting unit 810 transfers the expansion tag frame 2200 received from the frame analysis unit 3200 to the frame transfer unit 820 without executing rewriting processing.

The frame transfer unit 820 outputs the expansion tag frame 2200 to the output port p1 received from the table search unit 3730.

On the other hand, processing to be executed when the core switch C6 receives the expansion tag frame 3600 from the edge switch E8 will be as follows. The frame analysis unit 3200 analyzes that the input frame is the expansion tag frame 300 to notify the table search unit 3730 of header information, frame kind information, input port information and priority information and the frame rewriting unit 810 of the entire frame or a payload part. Here, the input information of the input frame indicates a low-priority frame.

Because reference to the Tag table 4001 finds that the output port for the expansion tag=g5 is the port p1 and the route path cost is 2 and that the output port for failure occurrence is the port p2 and the route path cost is 11 and also because the received frame is a low-priority frame, the table search unit 3730 determines the output port p2 as an output destination. Thereafter, notify the frame rewriting unit 810 of no frame rewriting and notify the frame transfer unit 820 of the determined output port p2.

The frame rewriting unit 810 transfers the expansion tag frame 3600 received from the frame analysis unit 3200 to the frame transfer unit 820 without executing rewriting processing.

The frame transfer unit 820 outputs the expansion tag frame 3600 to the output port p2 received from the table search unit 3730.

The edge switch E6 connected to the side of the port p1 of the core switch C6, the edge switch E5 at a hop subsequent to the edge switch E6, the edge switch E7 connected to the side of the port p2 of the edge switch E8 and the core switch C5 connected to the side of the port p2 of the core switch C6 execute the same processing as that described in the first and second exemplary embodiments to transfer the frame (although route path costs of an output port and an output port for failure occurrence are newly introduced into the Tag table 3800 in each case, because each switch fails to hold an Alternate port in the present network structure, substantial processing is the same). As a result, the Ethernet (registered trademark) frames 2100 and 3400 arrive at the user terminals T5 and T9 as a destination.

Since frame transfer to be executed when a failure occurs in the network is the same as that of the third exemplary embodiment, no description will be made thereof.

As described in the foregoing, because the high-priority Ethernet (registered trademark) frame 2100 sent from the user terminal T8 to the user terminal T5 and the low-priority Ethernet (registered trademark) frame 3400 sent from the user terminal T10 to the user terminal T9 will be transferred to the destination user terminals T5 and T9 through the lowest cost path to the edge switch E5 as the destination, that is, a path (a) through the edge switch E8, the core switch C6, the edge switch E6 and the edge switch E5 or a path (b) through the edge switch E8, the edge switch E7, the core switch C5 and the edge switch E5.

Here, as to frames transferred on the (a) path, because the core switch C6 has an output port for failure occurrence, a low-priority frame among received frames will be output to the side of the port p2 and transferred to the user terminal T9 as a destination through the core switch C6, the core switch C5 and the edge switch E5.

It can be designed to, when a cost of a route path to a terminal as a sending destination exceeds a route path cost allowable value set in advance for the network system, delete a port directed to the relevant path from the Tag table 3800.

Such arrangement prevents selection of a path whose route path cost exceeds an allowable value.

Effects of the Fourth Exemplary Embodiment

Thus, the transfer method of the present exemplary embodiment enables band use efficiency of the entire network to be improved by the use of a link yet to be used in the related art.

At this time, when there exist a plurality of paths whose costs to a destination are equal, transfer is executed distributably without taking priority into consideration and when there exist a plurality of paths whose costs are different, a high-priority frame is transferred through a lowest-cost path and a low-priority frame is transferred through other paths whose costs are as low as possible.

This enables transfer based on priority of data, while reducing unbalance in a volume of data caused by priority to even the amount of frame transfer.

According to the exemplary embodiments of the preset invention, based on port information of a spanning tree whose route node is a node connected to a destination terminal, each node on a network sets, in a forwarding table which holds an output port corresponding to an identifier of the node connected to the destination terminal, a port whose function is a route port and whose state is the forwarding state or a port adapted to a condition of a port whose function is an alternate port among ports of the spanning tree whose route node is a node connected to the destination terminal as an output port for the node connected to the destination terminal.

Then, when transferring a data frame transmitted from a transmission source terminal to the destination terminal, with reference to the forwarding table in which an output port for the node connected to the destination terminal is set, obtain an output port for the node and when there fails to exist a plurality of output ports obtained, determine the relevant output port as an output destination and transfer the data frame.

When there exist a plurality of output ports obtained, determine an output port for the node connected to the destination terminal from among the plurality of output ports to transfer the data frame based on predetermined algorithm, for example, such a method as round-robin or weighting round robin.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2006-038894, filed on Feb. 16, 2006, the disclosure of which is incorporated herein in its entirety by reference.

The invention claimed is:

1. A node of a network for transferring a data frame transmitted from a transmission source terminal to a destination terminal, which
   uses a spanning tree whose route node is a node connected to said destination terminal as a transfer path of said data frame from each node in the network to said node,
   determines an output port for said node based on port information of said spanning tree, and
   transfers a data frame to said node through said output port determined,
   wherein at the time of determining an output port for said node connected to the destination terminal, said node considers, as an output port for said node, a port whose function is a root port and whose state is a forwarding state or a port meeting a condition of a port whose function is an alternate port among ports of said spanning tree.

2. The node according to claim 1, which when determining an output port for said node connected to said destination terminal to find that there exist a plurality of ports whose function is a root port and whose state is a forwarding state or ports meeting a condition of a port whose function is an alternate port among ports of said spanning tree, determines an output port for said node from among the plurality of ports based on predetermined algorithm.

3. The node according to claim 1, which when determining an output port for said node connected to said destination terminal to find that there exist a plurality of ports whose function is a root port and whose state is a forwarding state or ports meeting a condition of a port whose function is an alternate port among ports of said spanning tree, determines an output port for said node from among the plurality of ports taking priority of a data frame to be transferred into consideration.

4. The node according to claim 3, which when determining an output port for said node connected to said destination terminal to find that there exist a plurality of ports whose function is a root port and whose state is the forwarding state or ports meeting a condition of a port whose function is an alternate port among ports of said spanning tree, determines an output port of said data frame whose priority is high to be a port which is a root port whose state is the forwarding state and determines an output port of said data frame whose priority is low to be a port which is an alternate port.

5. The node according to claim 3, which when determining an output port for said node connected to said destination terminal to find that there exist a plurality of ports whose function is a root port and whose state is the forwarding state or ports meeting a condition of a port whose function is an alternate port among ports of said spanning tree, determines an output port of said data frame whose priority is high to be a port which is an alternate port and determines an output destination of said data frame whose priority is low to be a port which is a root port whose state is the forwarding state.

6. The node according to claim 1, which when determining an output port for said node connected to said destination terminal to find that there exist a plurality of ports whose function is a root port and whose state is a forwarding state or ports meeting a condition of a port whose function is an alternate port among ports of said spanning tree, determines an output port for said node taking a path cost to said node and priority of a data frame into consideration.

7. The node according to claim 6, which when determining an output port for said node connected to said destination terminal to find that there exist a plurality of ports whose function is a root port and whose state is the forwarding state or ports meeting a condition of a port whose function is an alternate port among ports of said spanning tree, if a path cost of each port to said node is equal, determines an output port for said node based on predetermined algorithm and if said path cost is not equal, determines an output port for said node taking said path cost and priority of a data frame into consideration.

8. The node according to claim 7, which when determining an output port for said node connected to said destination terminal to find that there exist a plurality of ports whose function is a root port and whose state is the forwarding state or ports meeting a condition of a port whose function is an alternate port among ports of said spanning tree, if a path cost of each port to said node is equal, determines an output port for said node based on predetermined algorithm and if said path cost is not equal, determines an output destination of said data frame whose priority is high to be a port which is a root port whose state is the forwarding state and determines an output destination of said data frame whose priority is low to be a port which is an alternate port.

9. The node according to claim 7, which when determining an output port for said node connected to said destination terminal to find that there exist a plurality of ports whose function is a root port and whose state is the forwarding state or ports meeting a condition of a port whose function is an alternate port among ports of said spanning tree, if a path cost of each port to said node is equal, determines an output port for said node based on predetermined algorithm and if said path cost is not equal, determines an output destination of said data frame whose priority is high to be a port which is an alternate port and determines an output destination of said data frame whose priority is low to be a port which is a root port whose state is the forwarding state.

10. The node according to claim 2, wherein said algorithm for determining an output port is a method of determining a port from which a data frame is to be output from among a plurality of ports by round robin or weighting round robin.

11. The node according to claim 2, wherein said algorithm for determining an output port is a method of determining a port from which a data frame is to be output from among a plurality of ports based on header information of the data frame.

12. The node according to claim 2, wherein said algorithm for determining an output port is a method of determining a port from which a data frame is to be output from among a plurality of ports based on contents recited in a payload of the data frame.

13. The node according to claim 2, wherein said algorithm for determining an output port is a method of determining a port from which a data frame is to be output from among a plurality of ports based on header information of the data frame and contents recited in a payload of the data frame.

14. The node according to claim 10, wherein when said algorithm is a method by weighting round robin, a probability of being selected as a port from which the data frame is to be output from among ports meeting said condition is determined by a link speed of a link connected to said port.

15. The node according to claim 10, wherein when said algorithm is a method by weighting round robin, a probability of being selected as a port from which the data frame is to be output from among ports meeting said condition is determined by a path cost of said port to said node connected to the destination terminal.

16. The node according to claim 1, comprising:
a forwarding table which holds an output port corresponding to an identifier of a node connected to said destination terminal;
a spanning tree control unit which executes processing of said spanning tree;
a table control unit which writes into said forwarding table, as an output port for said node, a port whose function is a root port and whose state is a forwarding state or a port meeting a condition of a port whose function is an alternate port among ports of said spanning tree whose route node is said node based on port information of said spanning tree notified from said spanning tree control unit; and
an output port determination unit which refers to said forwarding table to determine an output port for said node.

17. The node according to claim 1, comprising:
a forwarding table which holds an output port corresponding to an identifier of a node connected to said destination terminal;
a spanning tree control unit which executes processing of said spanning tree;
a table control unit which writes into said forwarding table, as an output port for said node, a port whose function is a root port and whose state is a forwarding state or a port meeting a condition of a port whose function is an alternate port among ports of said spanning tree whose route node is said node based on port information of said spanning tree notified from said spanning tree control unit; and
an output port determination unit which refers to said forwarding table to obtain an output port for said node and when there exist a plurality of said output ports, determines an output port for said node based on predetermined algorithm.

18. The node according to claim 1, comprising:
a forwarding table which holds an output port and an output port for failure occurrence corresponding to an identifier of a node connected to said destination terminal;
a spanning tree control unit which executes processing of said spanning tree;
a table control unit which writes into said forwarding table, as an output port for said node, a port whose function is a root port and whose state is a forwarding state or a port meeting a condition of a port whose function is an alternate port among ports of said spanning tree whose route node is said node based on port information of said spanning tree notified from said spanning tree control unit; and
an output port determination unit which refers to said forwarding table to obtain an output port for said node and when there exist a plurality of said output ports, if the plurality of ports include a port whose failure is detected, excludes the port whose failure is detected from said plurality of ports to determine an output port for said node based on predetermined algorithm.

19. The node according to claim 1, comprising:
a forwarding table which holds an output port and an output port for failure occurrence corresponding to an identifier of a node connected to said destination terminal;
a spanning tree control unit which executes processing of said spanning tree;
a table control unit which writes a port whose function is a root port and whose state is a forwarding state into said forwarding table as an output port for said node and a port whose function is an alternate port into said forwarding table as an output port for failure occurrence for said node among ports of said spanning tree whose route node is said node based on port information of said spanning tree notified from said spanning tree control unit; and
an output port determination unit which refers to said forwarding table to obtain an output port and an output port for failure occurrence for said node and when there exist a plurality of ports obtained, determines an output port taking priority of said data frame into consideration.

20. The node according to claim 19, wherein said output port determination unit, when referring to said forwarding table and obtaining an output port and an output port for failure occurrence for said node to find that there exist a plurality of ports obtained, determines an output destination of a data frame whose priority for said node is high to be said output port and an output destination of a data frame whose priority for said node is low to be said output port for failure occurrence.

21. The node according to claim 19, wherein said output port determination unit, when referring to said forwarding table and obtaining an output port and an output port for failure occurrence for said node to find that there exist a plurality of ports obtained, determines an output destination of a data frame whose priority for said node is high to be said output port for failure occurrence and determines an output destination of a data frame whose priority for said node is low to be said output port.

22. The node according to claim 1, comprising:
a forwarding table which holds an output port and a route path cost of the same and an output port for failure occurrence and a route path cost of the same corresponding to an identifier of a node connected to said destination terminal;
a spanning tree control unit which executes processing of said spanning tree;
a table control unit which writes a port whose function is a root port and whose state is a forwarding state as an output port for said node together with the route path cost of the same into said forwarding table and a port whose function is an alternate port as an output port for failure occurrence for said node together with the route path cost of the same into said forwarding table among ports of said spanning tree whose route node is said node based on port information of said spanning tree notified from said spanning tree control unit; and
an output port determination unit which refers to said forwarding table to obtain an output port and an output port for failure occurrence for said node and when there exist a plurality of said output ports, determines an output port taking a route path cost as a cost of a path to said node and priority of a data frame into consideration.

23. The node according to claim 22, wherein said output port determination unit, when referring to said forwarding table and obtaining an output port and an output port for failure occurrence for said node to find that there exist a plurality of ports obtained, if each said route path cost is equal, determines said output port for said node based on predetermined algorithm and if each said route path cost is not equal, determines an output port for said node taking priority of said data frame into consideration.

24. The node according to claim 22, wherein said output port determination unit, when referring to said forwarding table and obtaining an output port and an output port for failure occurrence for said node to find that there exist a plurality of ports obtained, if each said route path cost is equal, determines an output port for said node based on predetermined algorithm and if each said route path cost is not equal, determines an output destination of a data frame whose priority for said node is high to be said output port and determines an output destination of a data frame whose priority for said node is low to be said output port for failure occurrence.

25. The node according to claim 22, wherein said output port determination unit, when referring to said forwarding table and obtaining an output port and an output port for failure occurrence for said node to find that there exist a plurality of ports obtained, if each said route path cost is equal, determines an output port for said node based on predetermined algorithm and if each said route path cost is not equal, determines an output destination of a data frame whose priority for said node is high to be said output port for failure occurrence and determines an output destination of a data frame whose priority for said node is low to be said output port.

26. The node according to claim 1, wherein said output port determination unit uses, as said predetermined algorithm, a method of determining a port from which a data frame is to be output by round robin or weighting round robin.

27. The node according to claim 17, wherein said output port determination unit uses, as said predetermined algorithm, a method of determining a port from which a data frame is to be output based on header information of the data frame.

28. The node according to claim 17, wherein said output port determination unit uses, as said predetermined algorithm, a method of determining a port from which a data frame is to be output based on contents recited in a payload of the data frame.

29. The node according to claim 17, wherein said output port determination unit uses, as said predetermined algorithm, a method of determining a port from which a data frame is to be output based on header information of the data frame and contents recited in a payload of the data frame.

30. The node according to claim 26, wherein when said predetermined algorithm used by said output port determination unit is a method by weighting round robin, a probability of being selected as a port from which a data frame is to be output from among ports meeting said condition is determined by a link speed of a link connected to said port.

31. The node according to claim 26, wherein when said predetermined algorithm used by said output port determination unit is a method by weighting round robin, a probability of being selected as a port from which a data frame is to be output from among ports meeting said condition is determined by a path cost of said port to said node connected to the destination terminal.

32. The node according to claim 1, wherein an identifier of a node connected to said destination terminal is stored in a VLAN tag.

33. The node according to claim 1, wherein an identifier of a node connected to said destination terminal is a MAC address.

34. A frame transfer method in a network for transferring a data frame transmitted from a transmission source terminal to a destination terminal, wherein each node in said network
- using a spanning tree whose route node is a node connected to said destination terminal as a transfer path of said data frame to the node connected to said destination terminal,
- determining an output port for the node connected to said destination terminal based on port information of said spanning tree, and
- transferring the data frame to said node connected to said destination terminal through said output port determined,
- wherein at the time of determining an output port for said node connected to the destination terminal, a port whose function is a root port and whose state is a forwarding state or a port meeting a condition of a port whose function is an alternate port is considered as an output port for said node among ports of said spanning tree.

35. A network system for transferring a data frame transmitted from a transmission source terminal to a destination terminal, wherein each node in said network
- uses a spanning tree whose route node is a node connected to said destination terminal as a transfer path of said data frame to the node connected to said destination terminal,
- determines an output port for the node connected to said destination terminal based on port information of said spanning tree, and
- transfers the data frame to the node connected to said destination terminal through said output port determined,
- wherein at the time of determining an output port for said node connected to the destination terminal, a port whose function is a root port and whose state is a forwarding state or a port meeting a condition of a port whose function is an alternate port is considered as an output port for said node among ports of said spanning tree.

36. A non-transitory computer readable storage medium storing a frame transfer program executed on a node which is a computer in a network for transferring a data frame transmitted from a transmission source terminal to a destination terminal, said frame transfer program comprising the functions of:
- using a spanning tree whose route node is a node connected to said destination terminal as a transfer path to the node connected to said destination terminal,
- based on port information of said spanning tree, determining an output port for the node connected to said destination terminal,
- transferring the frame to the node connected to said destination terminal through said output port determined, and
- at the time of determining an output port for said node connected to the destination terminal, considering a port whose function is a root port and whose state is a forwarding state or a port meeting a condition of a port whose function is an alternate port as an output port for said node among ports of said spanning tree.

* * * * *